United States Patent
Yashiki

(10) Patent No.: US 10,460,676 B2
(45) Date of Patent: Oct. 29, 2019

(54) DISPLAY DEVICE

(71) Applicant: Sharp Kabushiki Kaisha, Sakai, Osaka (JP)

(72) Inventor: Masafumi Yashiki, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 233 days.

(21) Appl. No.: 15/511,043

(22) PCT Filed: Jul. 16, 2015

(86) PCT No.: PCT/JP2015/070372
§ 371 (c)(1),
(2) Date: Mar. 14, 2017

(87) PCT Pub. No.: WO2016/042907
PCT Pub. Date: Mar. 24, 2016

(65) Prior Publication Data
US 2017/0263190 A1    Sep. 14, 2017

(30) Foreign Application Priority Data
Sep. 16, 2014    (JP) .................................. 2014-187729

(51) Int. Cl.
*G09G 3/34*        (2006.01)
*G02F 1/1335*   (2006.01)
(Continued)

(52) U.S. Cl.
CPC ....... *G09G 3/342* (2013.01); *G02F 1/133621* (2013.01); *G09G 3/3406* (2013.01);
(Continued)

(58) Field of Classification Search
CPC .... G09G 3/342; G09G 3/3406; G09G 3/3413; G09G 2320/0646; G02F 1/133621; G02F 2203/01
See application file for complete search history.

(56) References Cited

U.S. PATENT DOCUMENTS

2010/0085289 A1* 4/2010 Munteanu ............ G09G 3/3406
                                                                    345/88
2013/0293598 A1* 11/2013 Ishihara ............... G09G 3/3648
                                                                    345/690

FOREIGN PATENT DOCUMENTS

JP               2002-318564 A         10/2002

* cited by examiner

*Primary Examiner* — Robert J Michaud
(74) *Attorney, Agent, or Firm* — Keating & Bennett, LLP

(57) ABSTRACT

Provided is a display device for making an easily viewed display of both an image displayed in an image display region and a background displayed in a transparent display region when driven by a field sequential system. When a liquid crystal display device provided with a liquid crystal panel divided into an image display region and a transparent display region is driven by a field sequential system, the transparent display region) is given WRGB data for transparent display generated with transparency as a priority, and the image display region is given WRGB data for image display generated with color breakup reduction as a priority. Furthermore, backlight light from a light-emitting region provided on a light guide plate disposed on the back surface side of the liquid crystal panel is irradiated in the image display region. Thus, the background can be displayed with high transparency in the transparent display region and the image can be displayed with low color breakup in the image display region.

9 Claims, 14 Drawing Sheets

(51) Int. Cl.
*G09G 3/36* (2006.01)
*G09G 5/04* (2006.01)

(52) U.S. Cl.
CPC ......... *G09G 3/3413* (2013.01); *G09G 3/3607* (2013.01); *G09G 3/3648* (2013.01); *G09G 5/04* (2013.01); *G02F 2001/133622* (2013.01); *G02F 2203/01* (2013.01); *G09G 2300/0452* (2013.01); *G09G 2310/08* (2013.01); *G09G 2320/064* (2013.01); *G09G 2320/0646* (2013.01)

LUT24

| 0 | 0 | 0 | 0 | 0 | 0 |
|---|---|---|---|---|---|
| 0 | 1 | 1 | 1 | 1 | 0 |
| 0 | 1 | 1 | 1 | 1 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

DISPLAY DEVICE

TECHNICAL FIELD

The present invention relates to display devices, particularly to a display device capable of displaying both a color image and a background by performing drive in a field-sequential mode.

BACKGROUND ART

One of the drive modes in which to display a color image on a liquid crystal display device is a field-sequential mode. In the field-sequential mode, for example, one frame is divided into three fields, red (R), green (G), and blue (B), such that red (R), green (G), and blue (B) light-emitting elements included in a backlight are sequentially lit up in a time division manner for the respective fields, and image data corresponding to each color is written to pixels in synchronization with the timing of lighting up the light-emitting elements. As a result, the viewer can see a color image because of an afterimage phenomenon in the eye. In this manner, in the case of a liquid crystal display device driven in the field-sequential mode, no color filters are provided for each pixel, and images in various colors are sequentially displayed in a time division manner. Accordingly, when compared to the color filter mode, the field-sequential mode renders it possible to increase transmittance and thereby reduce power consumption. Moreover, unlike in the color filter mode, there is no need to divide each pixel into three subpixels, with the result that high-resolution images can be displayed.

However, in the case of the liquid crystal display device in the field-sequential mode, the light-emitting elements for the colors are lit up respectively at different times in a time division manner, and therefore, in the case where an object moving at high speed is displayed or the viewer quickly moves his/her line of sight, there occurs a problem with a phenomenon called color breakup where the outlining color of an object is split into red, green, and blue and appears to be iridescent. To reduce such color breakup, it is known that in addition to the red, green, and blue fields corresponding to the light-emitting elements included in the backlight, a field for light in a mixture of at least two colors, such as a white (W) field for which the red, green, and blue light-emitting elements are lit up simultaneously, is inserted in each frame (Patent Document 1).

CITATION LIST

Patent Document

Patent Document 1: Japanese Laid-Open Patent Publication No. 2002-318564

SUMMARY OF THE INVENTION

Problems to be Solved by the Invention

In the case where the method described in Patent Document 1 is applied to a liquid crystal display device provided with not only an image display area, in which an image is displayed, but also a transparent display area, which becomes transparent to display a background, problems as below arise. In an area of a light guiding plate corresponding to the image display area of a liquid crystal panel, there is provided a light-emitting area for emitting backlight toward the image display area.

In the case of such a liquid crystal display device, when a white field is inserted in each frame, grayscale values, which are field data for the image display area and the transparent display area, are obtained by the following equations (12) to (15).

$$W = \min(R, G, B) \tag{12}$$

$$R' = R - W \tag{13}$$

$$G' = G - W \tag{14}$$

$$B' = B - W \tag{15}$$

Here, R, G, and B are the grayscale values respectively of red-, green-, and blue-component image data included in input image data, W is the grayscale value of image data for the inserted white field, and R', G', and B' are the grayscale values respectively of red-, green-, and blue-field image data adjusted by inserting the white field.

By inserting the white field thus obtained in each frame, color breakup is rendered less likely to occur in images displayed in the image display area. However, in the transparent display area, the grayscale values for the red, green, and blue fields become low as in the image display area, so that transparency is reduced to such an extent that the background is less visible. On the other hand, if the grayscale values for the red, green, and blue fields are increased in order not to reduce the transparency of the transparent display area, an image with a color-breakup artifact is more likely to be seen in the image display area.

Therefore, an objective of the present invention is to provide a display device which, when being driven in a field-sequential mode, clearly displays both an image in an image display area and a background in a transparent display area.

Means for Solving the Problems

A first aspect of the present invention is directed to a display device providing color display in a field-sequential mode by dividing externally provided input image data into a plurality of fields for each frame, providing light in a different color for each of the fields, and providing image data corresponding to the provided light, the device including:

a display panel with a plurality of pixels arranged in a matrix;

irradiating means configured to irradiate the display panel with light in a different color for each of the fields, the irradiating means including a plurality of light sources emitting light in different colors;

a driver circuit configured to write the image data to the pixels of the display panel for each of the fields;

a light source control circuit configured to control the irradiating means to provide light in a different color for each of the fields; and data generating means configured to control the driver circuit and the light source control circuit to write image data corresponding to colors of light emitted by the light sources, provided that the frame is divided into more fields than the number of the light sources, at least two of the light sources emit light in a mixed color for at least one of the fields, and the light sources sequentially emit light for the remaining fields, wherein, the data generating means includes holding means configured to hold reference values for specifying an image display area and compare specific values for identifying the pixels included in the input image data with the reference values being read from the holding means, so that any pixel with the specific value within a range specified by the reference values is considered to be within the image display area in which image display is provided by obtaining a grayscale value of the image data for each of the fields so as to prioritize color breakup reduction, and any pixel with the specific value out of the range specified by the reference values is considered to be within a transparent display area in which a background is displayed by obtaining a grayscale value of the image data for each of the fields so as to prioritize transparency.

A second aspect of the present invention provides the display device according to the first aspect of the present invention, wherein, the light sources are light sources emitting red, green, or blue light, and the frame includes a white field for which the red, green, and blue light are provided simultaneously, a red field for which the red light is provided, a green field for which the green light is provided, and a blue field for which the blue light is provided.

A third aspect of the present invention provides the display device according to the second aspect of the present invention, wherein, the data generating means further includes:

an image display data generating portion configured to obtain the grayscale value of the image data for the pixels for each of the fields so as to prioritize the color breakup reduction; and a transparent display data generating portion configured to obtain the grayscale value of the image data for the pixels for each of the fields so as to prioritize the transparency, the image display data generating portion generates image display data representing an image derived from the input image data, on the basis of the input image data using the minimum grayscale value of the image data for the red, green, and blue fields as a grayscale value of the image data for the white field, and new grayscale values of the image data for the red, green, and blue fields obtained by subtracting the grayscale value of the image data for the white field from each of the grayscale values of the image data for the red, green, and blue fields, and the transparent display data generating portion generates transparent display data for displaying the background on the basis of the input image data using the minimum grayscale value of the image data for the red, green, and blue fields as a grayscale value of the image data for the white field, and the grayscale values of the image data for the red, green, and blue fields as new grayscale values of the image data for the red, green, and blue fields.

A fourth aspect of the present invention provides the display device according to the second aspect of the present invention, wherein any two of the red, green, and blue light sources are lit up to add another mixed-color field for which any one of cyan, yellow, or magenta light is provided.

A fifth aspect of the present invention provides the display device according to the first aspect of the present invention, wherein, the light sources are light sources emitting red, green, or blue light, and the frame includes red, green, and blue fields as well as a mixed-color field for which any one of cyan, yellow, or magenta light is provided by lighting up any two of the red, green, and blue light sources.

A sixth aspect of the present invention provides the display device according to the first aspect of the present invention, wherein the data generating means includes:

a coordinate generating portion configured to obtain coordinate data indicating a position of a pixel provided by the input image data;

a determination portion including the holding means that holds the reference values and being configured to compare the coordinate data provided by the coordinate generating portion with the reference values being read from the holding means, thereby determining whether the coordinate data is data for a pixel within the image display area for which a grayscale value of image data is to be obtained for each field so as to prioritize transparency or data for a pixel within the transparent display area for which a grayscale value of image data is to be obtained for each field so as to prioritize color breakup reduction;

an image display data generating portion configured to generate image data for the pixels for each of the fields so as to prioritize color breakup reduction, on the basis of the input image data;

a transparent display data generating portion configured to generate image data for the pixels for each of the fields so as to prioritize transparency, on the basis of the input image data;

a selection portion configured to select and output either the data for the pixels generated by the image display data generating portion or the data for the pixels generated by the transparent display data generating portion, on the basis of a result of the determination by the determination portion;

a backlighting data generating portion configured to generate backlighting data for each frame; and a timing control portion configured to control the timing of outputting the backlighting data provided by the backlighting data generating portion and the timing of outputting the image data provided by the selection portion.

A seventh aspect of the present invention provides the display device according to the sixth aspect of the present invention, wherein the holding means is a first register configured to allow the reference values to be externally rewritten.

An eighth aspect of the present invention provides the display device according to the seventh aspect of the present invention, wherein, provided that the shape of the image display area is a rectangle, the reference values correspond to coordinates of four vertices of the image display area.

A ninth aspect of the present invention provides the display device according to the seventh aspect of the present invention, wherein, provided that the shape of the image display area is a rectangle, the reference values correspond to coordinates of one of four vertices of the image display area and coordinates of another vertex diagonal to that vertex.

A tenth aspect of the present invention provides the display device according to the seventh aspect of the present invention, wherein, provided that the shape of the image display area is a rectangle, the reference values correspond to coordinates of one of four vertices of the image display area and the width and the height of the rectangle.

An eleventh aspect of the present invention provides the display device according to the sixth aspect of the present invention, wherein the holding means is a lookup table that contains coordinates specifying the image display area as the reference values and allows the reference values to be externally rewritten for each of the pixels.

A twelfth aspect of the present invention provides the display device according to the sixth aspect of the present invention, wherein, the coordinate generating portion includes:
a second register configured to hold shape data representing the shape of the image display area; and
a counter configured to count the number of pixels provided by the input image data until the number of pixels reaches the total number of pixels for one frame determined by the shape data held in the second register, and
the coordinate generating portion provides the determination portion with the coordinate data upon each increment of the number of pixels on the counter.

A thirteenth aspect of the present invention provides the display device according to the first aspect of the present invention, wherein the data generating means includes:
a determination portion including the holding means that holds externally rewritable reference grayscale values for the fields as the reference values, the determination portion being configured to compare a grayscale value of a pixel provided by the input image data with the reference grayscale value being read from the holding means, thereby determining whether the pixel is a pixel within the image display area for which a grayscale value of image data is to be obtained for each field so as to prioritize transparency or data for a pixel within the transparent display area for which a grayscale value of image data is to be obtained for each field so as to prioritize color breakup reduction;
an image display data generating portion configured to generate the image data for the pixels for each of the fields so as to prioritize color breakup reduction, on the basis of the input image data;
a transparent display data generating portion configured to generate the image data for the pixels for each of the fields so as to prioritize transparency, on the basis of the input image data;
a selection portion configured to select and output either the image data for the pixels generated by the image display data generating portion or the image data for the pixels generated by the transparent display data generating portion, on the basis of a result of the determination by the determination portion;
a backlighting data generating portion configured to generate backlighting data for each frame; and
a timing control portion configured to control the timing of outputting the backlighting data provided by the backlighting data generating portion and the timing of outputting the image data provided by the selection portion.

A fourteenth aspect of the present invention provides the display device according to the first aspect of the present invention, further including:
a housing to which the display panel is attachable; and
illuminating means including a plurality of light sources attached to an inner surface of the housing, wherein,
the display panel is attached to one plane of the housing, the irradiating means is attached to the housing so as to be selectable between states in which the display panel is or is not irradiated with backlight,
the data generating means includes:
a determination portion including the holding means that holds externally rewritable display area data as a reference value indicating whether the display panel is used as the image display area or the transparent display area, the determination portion being configured to determine whether the pixel represented by the input image data is within the image display area for which a grayscale value of image data is to be obtained for each field so as to prioritize transparency or within the transparent display area for which a grayscale value of image data is to be obtained for each field so as to prioritize color breakup reduction, on the basis of the display area data held in the holding means;
an image display data generating portion configured to generate the image data for the pixels for each of the fields so as to prioritize color breakup reduction, on the basis of the input image data;
a transparent display data generating portion configured to generate the image data for the pixels for each of the fields so as to prioritize transparency, on the basis of the input image data;
a selection portion configured to select and output either the image data generated by the image display data generating portion or the image data generated by the transparent display data generating portion, on the basis of a result of the determination by the determination portion;
a backlighting data generating portion configured to generate backlighting data for each frame; and
a timing control portion configured to control the timing of outputting the backlighting data provided by the backlighting data generating portion and the timing of outputting the image data provided by the selection portion, and
provided that the display panel is used as the image display area, the irradiating means is lit up so as to irradiate the display panel with backlight but the illuminating means is not lit up, whereas provided that the display panel is used as the transparent display area, the irradiating means is not lit up so as not to irradiate the display panel with backlight but the illuminating means is lit up.

Effect of the Invention

In the first aspect of the present invention, provided that each frame is divided into more fields than the number of light sources included in the irradiating means, two or more of the light sources emit light in a mixed color for at least one of the fields, and the light sources sequentially emit light for the remaining fields, specific values for identifying the pixels included in the input image data are compared with the reference values, so that any pixel with the specific value within a range specified by the reference values is considered to be within the image display area in which image display is provided by obtaining a grayscale value for each field so as to prioritize color breakup reduction, and any pixel with the specific value out of the range specified by the reference values is considered to be within the transparent display area in which background display is provided by obtaining a grayscale value for each field so as to prioritize transparency. Thus, it is possible to provide a background in the transparent display area with high transparency and an image with reduced color breakup in the image display area.

In the second aspect of the present invention, specifically, the light sources included in the irradiating means are red, green, and blue light sources, and in the case where the mixed color of light from the two or more of the light sources is white, which is obtained by lighting up the red, green, and blue light sources simultaneously, it is possible to display a background in the transparent display area with high transparency and an image with reduced color breakup in the image display area.

In the third aspect of the present invention, the light sources included in the irradiating means are red, green, and blue light sources, and in the case where the mixed color of light from the two or more of the light sources is white, which is obtained by lighting up the red, green, and blue light sources simultaneously, image data for the pixels within the image display area is generated for each color field as image display data for the purpose of reducing color breakup, and image data for the pixels within the transparent display area is generated for each color field as transparent display data for the purpose of achieving high transparency. Thus, it is possible to display a background in the transparent display area with high transparency and an image with reduced color breakup in the image display area.

In the fourth aspect of the present invention, any two of the red, green, and blue light sources are lit up to add another mixed-color field for which any one of cyan, yellow, or magenta light is provided. Thus, it is possible to further reduce color breakup.

In the fifth aspect of the present invention, the light sources included in the irradiating means are red, green, and blue light sources, and a mixed-color field, for which any one of cyan, yellow, or magenta light is provided by lighting up any two of the red, green, and blue light sources, is inserted in place of the white field as used in the third aspect of the present invention. Thus, as in the case where the white field is inserted, it is possible to reduce color breakup in an image displayed in the image display area without reducing the transparency of the transparent display area.

In the sixth aspect of the present invention, whether a pixel provided by the input image data is within the image display area or within the transparent display area is determined by the determination portion comparing the coordinates of the pixel with the coordinates of the image display area represented by the reference values held in the holding means. As a result, it is possible to readily determine whether a pixel provided by the input image data is within the image display area or within the transparent display area, so that the transparent display data and the image display data can be reliably generated on the basis of the determination result.

In the seventh aspect of the present invention, the holding means is the first register that holds the externally rewritable reference values. Thus, it is possible to readily change the size and the position of the image display area.

In the eighth aspect of the present invention, the reference values correspond to the coordinates of the four vertices of the image display area. Thus, it is possible to readily determine whether a pixel provided by the input image data is within the image display area.

In the ninth aspect of the present invention, when the shape of the image display area is a rectangle, the reference values held in the holding means correspond to the coordinates of one of the four vertices of the image display area and the coordinates of another vertex diagonal to that vertex. Thus, it is possible to achieve similar effects to the effects achieved by the eighth aspect of the present invention.

In the tenth aspect of the present invention, when the shape of the image display area is a rectangle, the reference values held in the holding means correspond to the coordinates of one of the four vertices of the image display area and the width and the height of the rectangle. Thus, it is possible to achieve similar effects to the effects achieved by the eighth aspect of the present invention.

In the eleventh aspect of the present invention, the reference values for use in determining whether a pixel provided by the input image data is within the image display area are contained in an externally rewritable lookup table. Thus, it is possible to readily provide the image display area in an arbitrary shape. In addition, it is also possible to simultaneously set a plurality of image display areas on the display panel.

In the twelfth aspect of the present invention, the position of a pixel provided by the input image data is obtained using the second register, which is intended for specifying the shape of the image display area for one frame, along with the counter, and the obtained position is provided to the determination portion as coordinate data. Thus, it is possible to readily and reliably obtain pixel coordinates.

In the thirteenth aspect of the present invention, the reference grayscale value is used as the reference value for use in determining whether a pixel provided by the input image data is within the image display area, and any pixel whose grayscale value is greater than or equal to the reference grayscale value is considered to be within the image display area. Thus, it is possible to readily determine whether a pixel provided by the input image data is within the image display area. In addition, since the input image data is used as given to determine whether the pixels are within the image display area, there is no need to provide the coordinate generating portion in the data generating means, with the result that the production cost thereof can be reduced.

In the fourteenth aspect of the present invention, when the display device is used as a see-through display, the grayscale value is obtained for each field so as to prioritize transparency. As a result, an exhibit placed behind the display panel can be seen clearly. On the other hand, in the case where the display device is used as a display for image display, the grayscale value is obtained for each field so as to prioritize color breakup reduction. As a result, color breakup in a displayed image is reduced. In this manner, the grayscale value of an image is optimally adjusted for each field in accordance with the purpose of use, thereby making it possible to display an image clearly.

BRIEF DESCRIPTION OF THE DRAWINGS

FIG. 9 is a diagram illustrating an example of a lookup table provided in a determination portion of the data generation/timing control circuit included in the liquid crystal display device according to the third embodiment.

MODES FOR CARRYING OUT THE INVENTION

1. First Embodiment

<1.1 Circuit Configuration of the Liquid Crystal Display Device>

Figure 1:
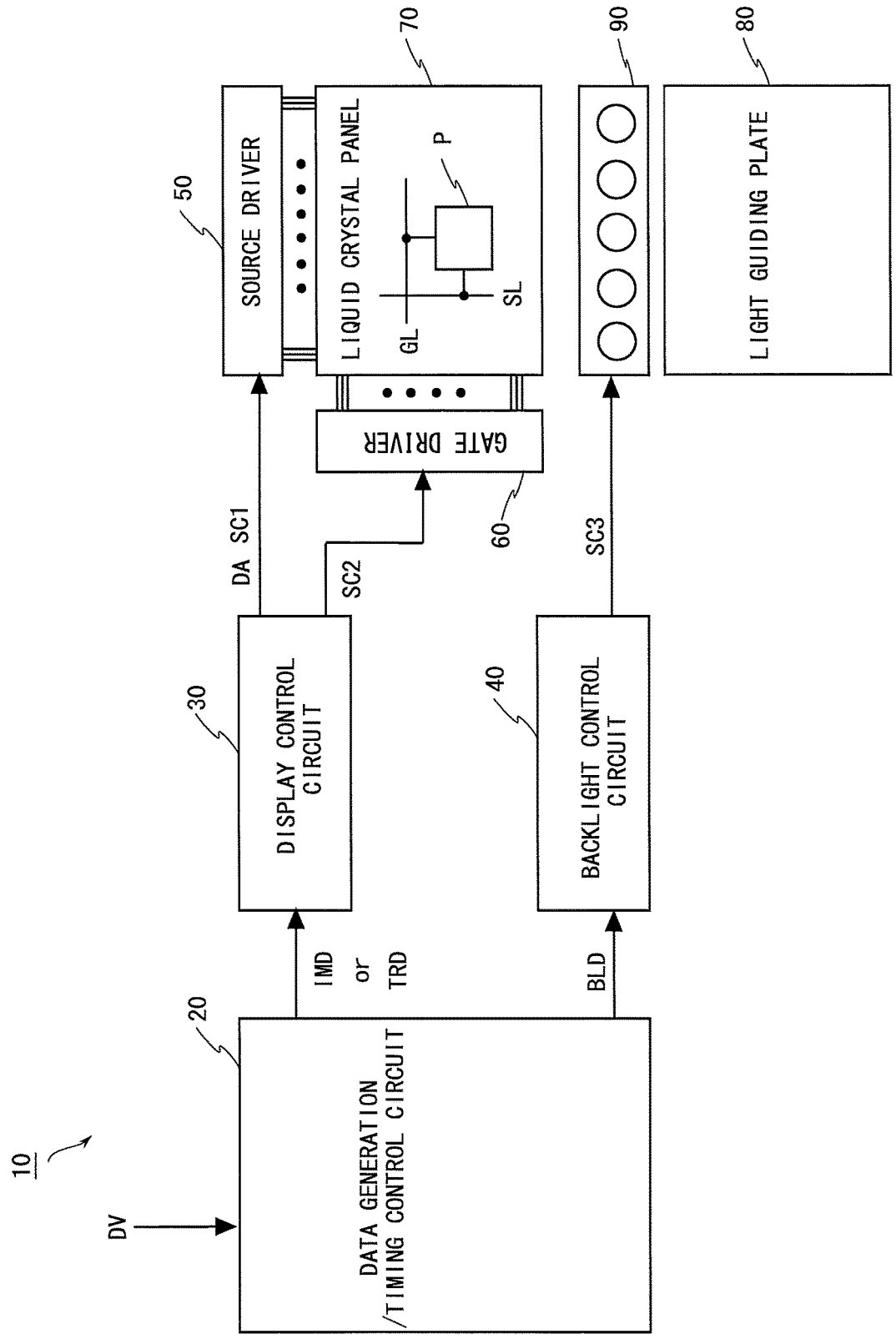
FIG. 1 is a block diagram illustrating the circuit configuration of a liquid crystal display device according to a first embodiment of the present invention.

FIG. 1 is a block diagram illustrating the circuit configuration of a liquid crystal display device 10 according to a first embodiment of the present invention. The liquid crystal display device 10 is driven in a field-sequential mode and includes a data generation/timing control circuit 20, a display control circuit 30, a backlight control circuit 40, a source driver 50, a gate driver 60, a light guiding plate 80, a backlighting light source 90, and a liquid crystal panel 70 with a plurality of pixels P arranged in a matrix.

It should be noted that the data generation/timing control circuit 20 will also be referred to as the "data generating means", the backlight control circuit 40 will also be referred to as the "light source control circuit", the display control circuit 30, the source driver 50, and the gate driver 60 will also be referred to collectively as the "driver circuit", the light guiding plate 80 and the backlighting light source 90 will also be referred to collectively as the "irradiating means", and the liquid crystal panel 70 will also be referred to as the "display panel".

In the field-sequential mode, the liquid crystal panel 70 is irradiated sequentially with red, green, and blue backlight for respective fields, so that images corresponding to the backlighting colors are sequentially displayed in a time division manner. Accordingly, the images displayed for the fields in a time division manner overlie one another in the viewer's retina owing to the afterimage phenomenon, so that the viewer sees the images as a color image.

Figure 2:
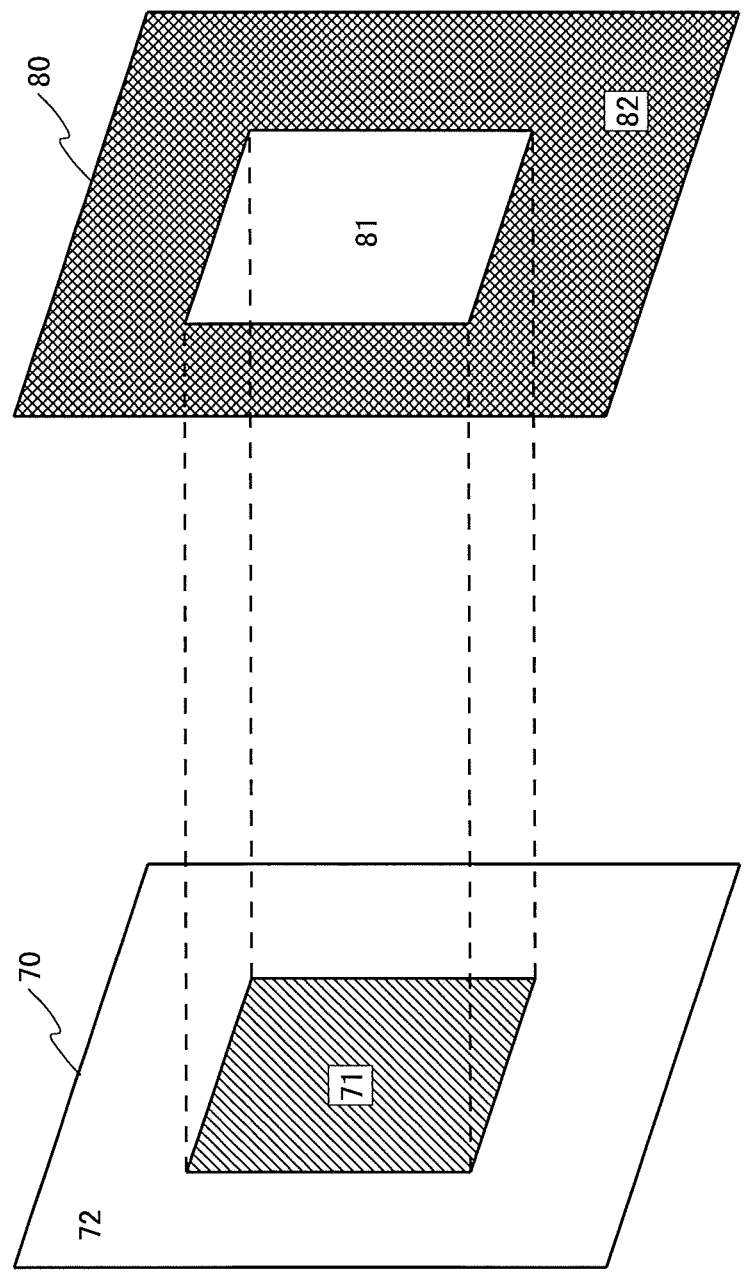
FIG. 2 is a diagram for the liquid crystal display device shown in FIG. 1, illustrating the relationship between a liquid crystal panel, which is provided with an image display area and a transparent display area, and a light guiding plate, which irradiates the image display area of the liquid crystal panel with backlight.

FIG. 2 is a diagram illustrating the relationship between the liquid crystal panel 70, which is provided with an image display area 71 and a transparent display area 72, and the light guiding plate 80, which irradiates the image display area 71 of the liquid crystal panel 70 with backlight. The liquid crystal panel 70 includes the image display area 71, in which an image in accordance with input image data DV is displayed, and the transparent display area 72, which becomes transparent to display a background, and in an area of the light guiding plate 80 which corresponds to the image display area 71, there is provided a light-emitting area 81 from which backlight is emitted toward the liquid crystal panel 70.

When input image data DV is externally provided pixel by pixel to the data generation/timing control circuit 20 at a frame rate of 60 Hz, the data generation/timing control circuit 20 determines whether the coordinates (X,Y) of each pixel P represented by the input image data DV are within the image display area 71. On the basis of the determination result, either four pieces of image data of white, red, green, and blue fields for the image display area (image display WRGB data IMD) or four pieces of image data of white, red, green, and blue fields for the transparent display area (transparent display WRGB data TRD) are selected and outputted in synchronization with backlighting data BLD, which is generated in order to control the backlighting light source 90. Note that the specific configuration and operation of the data generation/timing control circuit 20 will be described in detail later. In addition, the image display WRGB data IMD will also be referred to as the "image display data", and the transparent display WRGB data TRD will also be referred to as the "transparent display data".

The backlighting light source 90 includes LEDs (light-emitting devices), which emit red, green, and blue light and are arranged in a straight line, and is attached to an edge of the light guiding plate 80. The timing of lighting up the LEDs is controlled by a control signal SC3 generated by the backlight control circuit 40, in accordance with the backlighting data BLD outputted by the data generation/timing control circuit 20.

The light guiding plate 80 has a scattering agent printed in the form of dots on the back surface in the area corresponding to the image display area 71 of the liquid crystal panel 70. Light from the backlighting light source 90 attached to the light guiding plate 80 enters the light guiding plate 80 and propagates inside the light guiding plate 80 while being repeatedly subjected to total reflection on opposite surfaces of the light guiding plate 80. At this time, light incident on the scattering agent is spread by the scattering agent. The spread light is emitted from the front surface of the light guiding plate 80 and illuminates the image display area 71 of the liquid crystal panel 70 as backlight. Such an area with the scattering agent printed in the form of dots serves as the light-emitting area 81 for irradiating the image display area 71 of the liquid crystal panel 70 with backlight.

On the other hand, the area that has no printed dots becomes transparent without emitting light derived from the light source, and therefore, serves as a transmission area 82, which allows background light incident from the back surface side of the liquid crystal display device 10 to be transmitted toward the transparent display area 72 of the liquid crystal panel 70. Note that the light guiding plate 80 has the same rectangular shape and size as the liquid crystal panel 70, and therefore, the LEDs that serve as the light source may be attached to the light guiding plate 80 along an edge, two opposite edges, or four edges. Moreover, instead of dot printing, another method may be employed to render a specific area of the light guiding plate 80 as a light-emitting area 81.

The liquid crystal panel 70 provided with the transparent display area 72 along with the image display area 71 has formed thereon a plurality of scanning signal lines GL, which are arranged parallel to one another, a plurality of data signal lines SL, which are arranged parallel to one another so as to be perpendicular to the scanning signal lines GL, and a plurality of pixels P formed in the vicinity of the intersections of the scanning signal lines GL and the data signal lines SL. The scanning signal line GL is connected commonly to a plurality of pixels P arranged in the same row, and the data signal line SL is connected commonly to a plurality of pixels P arranged in the same column. Note that in FIG. 1, for convenience of explanation, the liquid crystal panel 70 is shown with only one pixel P connected to one scanning signal line GL and one data signal line SL.

Upon reception of image display WRGB data IMD or transparent display WRGB data TRD from the data generation/timing control circuit 20, the display control circuit 30 outputs a control signal SC1, including a source clock signal, a source start pulse, a latch strobe signal, etc., and a digital image signal DA to the source driver 50 and a control signal SC2, including a gate clock signal, a gate start pulse, etc., to the gate driver 60 on the basis of the WRGB data IMD or TRD.

The gate driver 60 provides a high-level output signal sequentially to each scanning signal line GL. As a result, the scanning signal lines GL are sequentially selected one at a time, and all pixels P in one row connected to the selected scanning signal line GL are selected collectively. The source driver 50 applies a signal voltage corresponding to the digital image signal DA to each data signal line SL, in accordance with the control signal SC1. As a result, the signal voltage is written to the pixels P in the selected row. In this manner, the image display area 71 irradiated with the backlight displays an image, and the transparent display area 72 having the background light transmitted therethrough displays a background.

Figure 3:
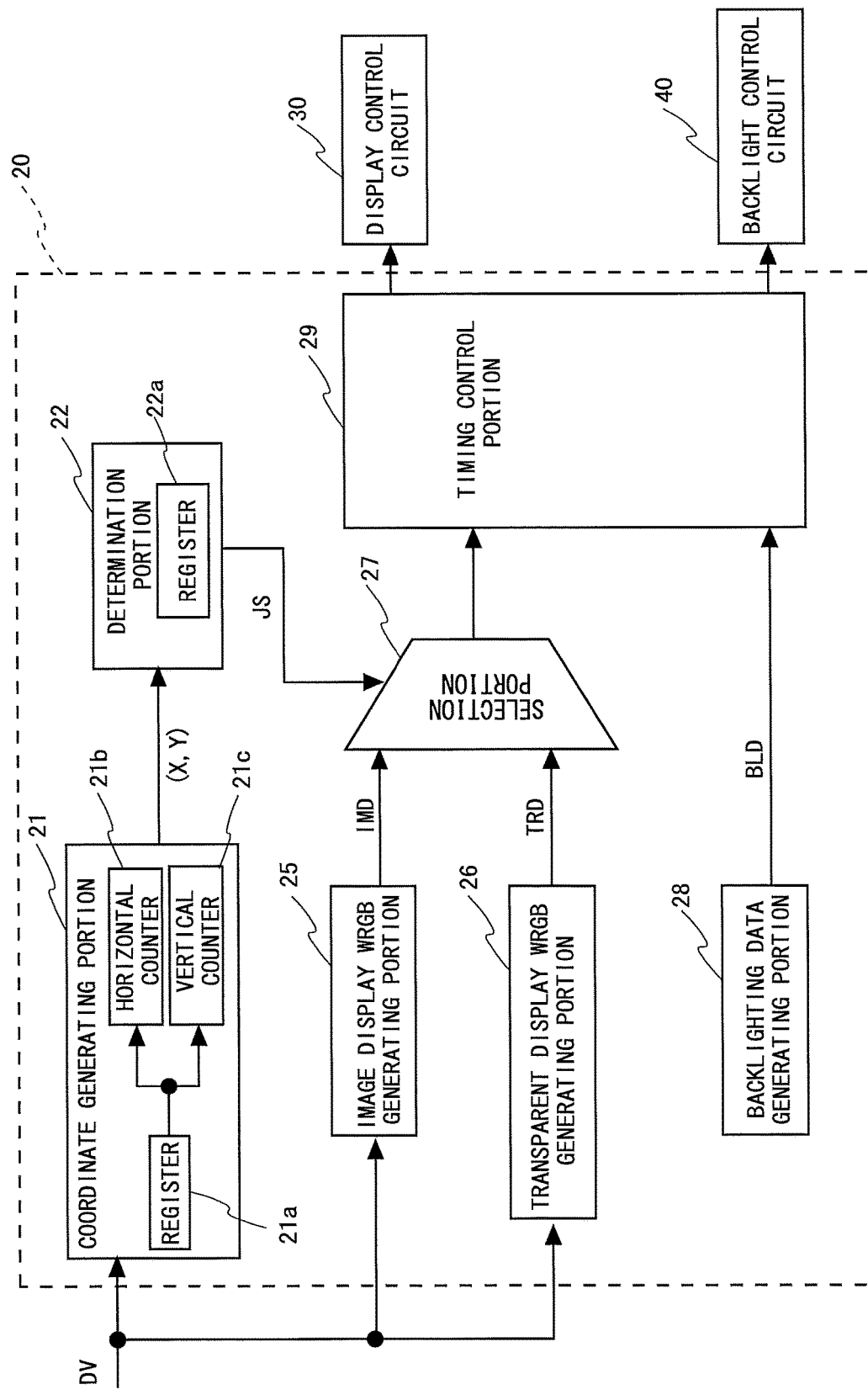
FIG. 3 is a block diagram illustrating the configuration of a data generation/timing control circuit included in the liquid crystal display device shown in FIG. 1.

FIG. 3 is a block diagram illustrating the configuration of the data generation/timing control circuit 20. As shown in FIG. 3, the data generation/timing control circuit 20 includes a coordinate generating portion 21, a determination portion 22, an image display WRGB generating portion 25, a transparent display WRGB generating portion 26, a selection portion 27, a backlighting data generating portion 28, and a timing control portion 29. Note that the image display WRGB generating portion 25 will also be referred to as the "image display data generating portion", and the transparent display WRGB generating portion 26 will also be referred to as the "transparent display data generating portion".

The coordinate generating portion 21 includes a register 21a capable of holding a total horizontal pixel number M and a total vertical line number N, a horizontal counter 21b capable of counting the number of horizontal pixels, and a vertical counter 21c capable of counting the number of vertical lines. When the coordinate generating portion 21 as such is externally provided with input image data DV, the count on each of the horizontal counter 21b and the vertical counter 21c is set to 1. Thereafter, upon every provision of input image data DV, the count on the horizontal counter 21b continues to be incremented by 1. Once the count on the horizontal counter 21b becomes equal to the total horizontal pixel number M, the horizontal counter 21b is reset. When input image data DV is further provided, the count on the horizontal counter 21b is set to 1, and the count on the vertical counter 21c is set to 2. Thereafter, upon every provision of input image data DV, the count on the horizontal counter 21b is incremented by 1, and once the count on the horizontal counter 21b becomes equal to the total horizontal pixel number M, the horizontal counter 21b is reset. When input image data DV is further provided, the count on the horizontal counter 21b is set to 1, and the count on the vertical counter 21c is set to 3. Thereafter, similar counting continues until the count on the horizontal counter 21b reaches M and the count on the vertical counter 21c reaches N. In this manner, the coordinates (X,Y) of each pixel P represented by input image data DV for one frame are obtained. Accordingly, the pixel coordinates (X,Y) can be obtained readily and reliably. Note that the pixel coordinates (X,Y) are given with respect to the coordinates of the pixel at the top left corner of the liquid crystal panel 70 given as the coordinates (0,0) of the origin, with X representing the horizontal position and Y representing the vertical position.

The determination portion 22 includes a register 22a for holding the coordinates of four vertices of the rectangular image display area 71 provided on the liquid crystal panel 70 in order to specify the image display area 71. Upon every provision of coordinates (X,Y) from the coordinate generating portion 21, the determination portion 22 determines whether the coordinates (X,Y) are within the image display area 71 on the basis of the coordinates of each vertex that are held in the register 22a, and provides the selection portion 27 with a determination value JS representing the result as "0" or "1". More specifically, the determination portion 22 provides the selection portion 27 with "1" when the determination is that the coordinates (X,Y) are within the image display area 71, or the determination portion 22 provides the selection portion 27 with "0" when the determination is that the coordinates (X,Y) are outside the image display area 71, i.e., within the transparent display area 72.

When the image display WRGB generating portion 25 is externally provided with input image data DV via the coordinate generating portion 21, the image display WRGB generating portion 25 generates image display WRGB data IMD for each of the white, red, green, and blue fields, and provides the generated data to the selection portion 27. Simultaneously with the generation of the image display WRGB data IMD, the transparent display WRGB generating portion 26 generates transparent display WRGB data TRD on the basis of the input image data DV, and provides the generated data to the selection portion 27. Note that the methods for generating the image display WRGB data IMD and the transparent display WRGB data TRD on the basis of the input image data DV will be described later.

The selection portion 27 selects either the image display WRGB data IMD or the transparent display WRGB data TRD on the basis of "1" or "0", the determination value JS provided by the determination portion 22, and provides the selected WRGB data to the timing control portion 29. The backlighting data generating portion 28 generates backlighting data BLD for sequentially lighting up the red, green, and blue LEDs, for each frame, and provides the generated data to the timing control portion 29.

The timing control portion 29 outputs the image display WRGB data IMD or the transparent display WRGB data TRD selected by the selection portion 27 to the display control circuit 30 for each frame. As a result, a signal voltage which corresponds to the digital image signal DA and is generated on the basis of the image display WRGB data IMD or the transparent display WRGB data TRD is written sequentially to each pixel P of the liquid crystal panel 70. The timing control portion 29 outputs the backlighting data BLD, which is generated by the backlighting data generating portion 28 for the white, red, green, and blue fields, to the backlight control circuit 40 such that the image display area 71 is irradiated with backlight at the time the signal voltage is written to each pixel P of the image display area 71. As a result, the image display area 71 is irradiated with white backlight for the white field and red backlight for the red field. Likewise, the image display area 71 is irradiated with green and blue light, respectively, for the green and blue fields, so that an image is displayed in accordance with the input image data DV. On the other hand, the transparent display area 72 is not irradiated with backlight and transmits background light therethrough, so that a background is displayed.

<Methods for Generating Grayscale Data for the Transparent Display Area and the Image Display Area>

Described are methods for generating the image display WRGB data IMD and the transparent display WRGB data TRD such that the transparent display area 72 displays a background with transmittance being kept high and the image display area 71 displays an image with reduced color breakup. In the following descriptions, each piece of the white, red, green, and blue image data is 8-bit data, and the grayscale value corresponding to each image data is 255.

First, the grayscale value given by the image data for the transparent display area 72 is discussed. For the transparent display area 72, the grayscale value is obtained for each field so as to prioritize transparency. Accordingly, the grayscale values for the red, green, and blue image data included in the input image data DV are assumed to be the maximum "255".

$$(R,G,B)=(255,255,255) \tag{1}$$

In this case, the grayscale value is obtained for each field by the following equations (2) to (5).

$$W=\min(R,G,B)=255 \tag{2}$$

$$R'=R=255 \tag{3}$$

$$G'=G=255 \tag{4}$$

$$B'=B=255 \tag{5}$$

As a result, for the transparent display area 72, the grayscale values of the fields are obtained by the following equation (6).

$$(W,R',G',B')=(255,255,255,255) \tag{6}$$

On the other hand, if the grayscale value of each field is obtained for the image display area 71 in the same manner as for the transparent display area 72, the transparency of the image display area 71 increases, so that a displayed image becomes more susceptible to color breakup. Therefore, for the image display area 71, to prioritize color breakup reduction, the grayscale value is obtained for each field by the following equations (7) to (10).

$$W=\min(R,G,B)=255 \tag{7}$$

$$R'=R-W=255-255=0 \tag{8}$$

$$G'=G-W=255-255=0 \tag{9}$$

$$B'=B-W=255-255=0 \tag{10}$$

As a result, for the image display area 71, the grayscale values of the fields are obtained by the following equation (11).

$$(W,R',G',B')=(255,0,0,0) \tag{11}$$

In this case, the grayscale value is "0" for three of the four field periods, resulting in reduced transparency, but an image can be displayed with reduced color breakup. Note that the description given above was about the case where the grayscale value is 255 for at least one of the red, green, and blue fields for the image display area 71. However, even in the case where the grayscale value of each field is lower than the aforementioned value, the grayscale value can still be obtained for each field using the equations (7) to (10).

In this manner, the grayscale value of each field is obtained differently for the image display area 71 and the transparent display area 72, so that the image display area 71 displays an image for which color breakup can be reduced and the transparent display area 72 displays a background with high transparency.

<Timing Chart>

Figure 4:
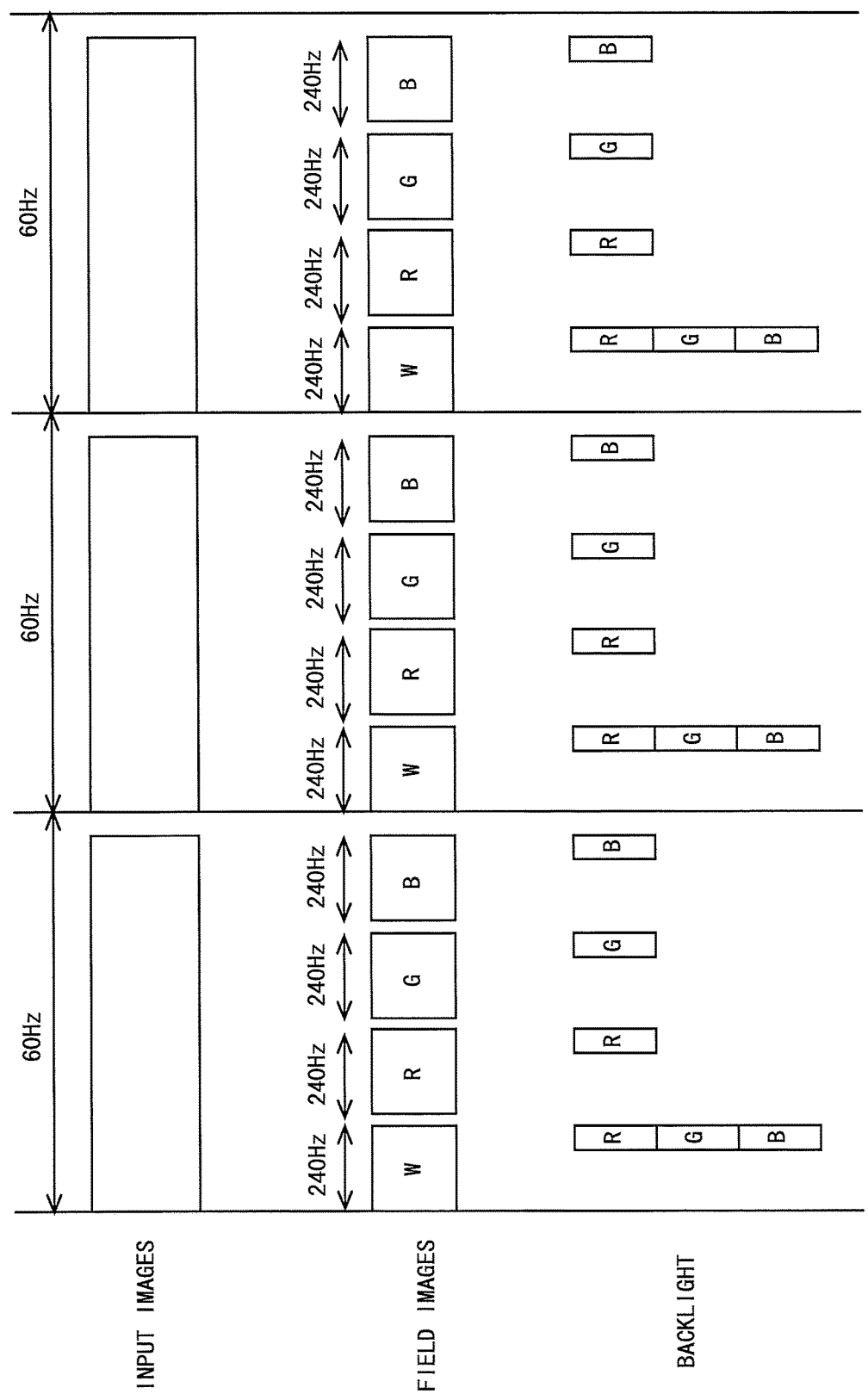
FIG. 4 is a timing chart for the liquid crystal display device shown in FIG. 1, showing the timing of a digital image signal being provided to the image display area and the timing of a backlight being lit up where white fields are inserted.

FIG. 4 is a timing chart showing the timing of the digital image signal DA being provided to the image display area 71 and the timing of the backlight being lit up where the white field is inserted. In the present embodiment, when input image data DV is provided at a frame rate of 60 Hz, the rate for each field is 240 Hz because each frame is split into the four fields, i.e., white, red, green, and blue, in a time division manner. For each of the white, red, green, and blue fields, image display WRGB data IMD generated by the image display WRGB generating portion 25 is sequentially written to the pixels P of the image display area 71. Upon completion of the writing of the white image data, the red, green, and blue LEDs of the backlighting light source 90 are lit up simultaneously. As a result, the pixels P of the image display area 71 are irradiated with white light from the light-emitting area 81 of the light guiding plate 80, so that an image for the white field is displayed. Next, the red image data is written to the image display area 71, and upon completion of the writing, the red LED is lit up. As a result, the pixels P of the image display area 71 are irradiated with red light from the light-emitting area 81 of the light guiding plate 80, so that an image for the red field is displayed. Similarly, images for the green and blue fields are sequentially displayed. In this manner, the images for the white, red, green, and blue fields are sequentially displayed for each frame, and therefore, the viewer can see an image with reduced color breakup in the image display area 71. Note that image data for each color with the grayscale value "255" is written to the transparent display area 72 as well, but the transparent display area 72 is not irradiated with backlight and therefore can display a background with high transparency. Moreover, the red, green, and blue LEDs of the backlighting light source 90 may be lit up simultaneously before the writing of the white image data is completed. Similarly, the red LED of the backlighting light source 90 may be lit up before the writing of the red image data is completed. In addition, the timing of lighting up the green and blue LEDs may be before the writing of their respective image data is completed.

<Effects>

In the present embodiment, when the liquid crystal display device 10 with the liquid crystal panel 70 divided into the image display area 71 and the transparent display area 72 is driven in a field-sequential mode, the transparent display WRGB data TRD, which is generated by the transparent display WRGB generating portion 26 so as to prioritize transparency, is selected for the transparent display area 72, and the image display WRGB data IMD, which is generated by the image display WRGB generating portion 25 so as to prioritize color breakup reduction, is selected for the image display area 71. Thus, it is possible to display a background in the transparent display area 72 with high transparency and an image with reduced color breakup in the image display area 71.

<Variants>

In the present embodiment, each frame consists of four fields, which include the additionally inserted white field along with the red, green, and blue fields. However, in place of the white field, there may be inserted a field for which cyan light is provided. The color of cyan is a mixture of green and blue, and therefore, the green and blue LEDs of the light source are lit up simultaneously, thereby providing cyan light, and thereafter, the red, green, and blue LEDs are lit up sequentially to provide light in these colors sequentially. Note that when the cyan light is provided, green and blue image data are written to the pixels of the image display area 71. Thus, as in the case where the white field is inserted, color breakup can be reduced in the image displayed in the image display area 71 without reducing the transparency of the transparent display area 72.

It should be noted that there may be inserted a field for which the image display area 71 is irradiated with yellow or magenta light, instead of cyan light, by simultaneously lighting up the red and green LEDs or the red and blue LEDs.

Furthermore, in addition to the four fields, i.e., white, red, green, and blue, at least one of the three fields for which cyan, yellow, or magenta light is provided may be further selected and inserted. For example, by inserting the cyan field, for which cyan light is provided, as a field in a mixed color, in addition to the white field, two fields in mixed colors are inserted in each frame, whereby color breakup can be further reduced.

Figure 5:
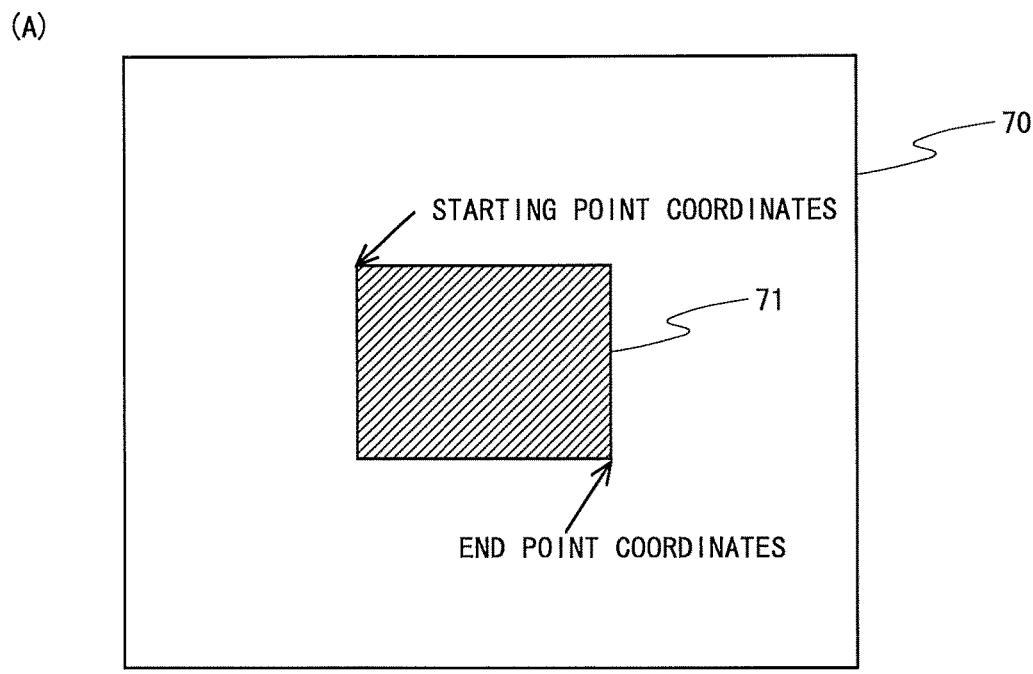
FIG. 5 provides diagrams for the liquid crystal panel of the liquid crystal display device shown in FIG. 1, where (A) illustrates another method for specifying the image display area, and (B) illustrates still another method for specifying the image display area.
Figure 5:
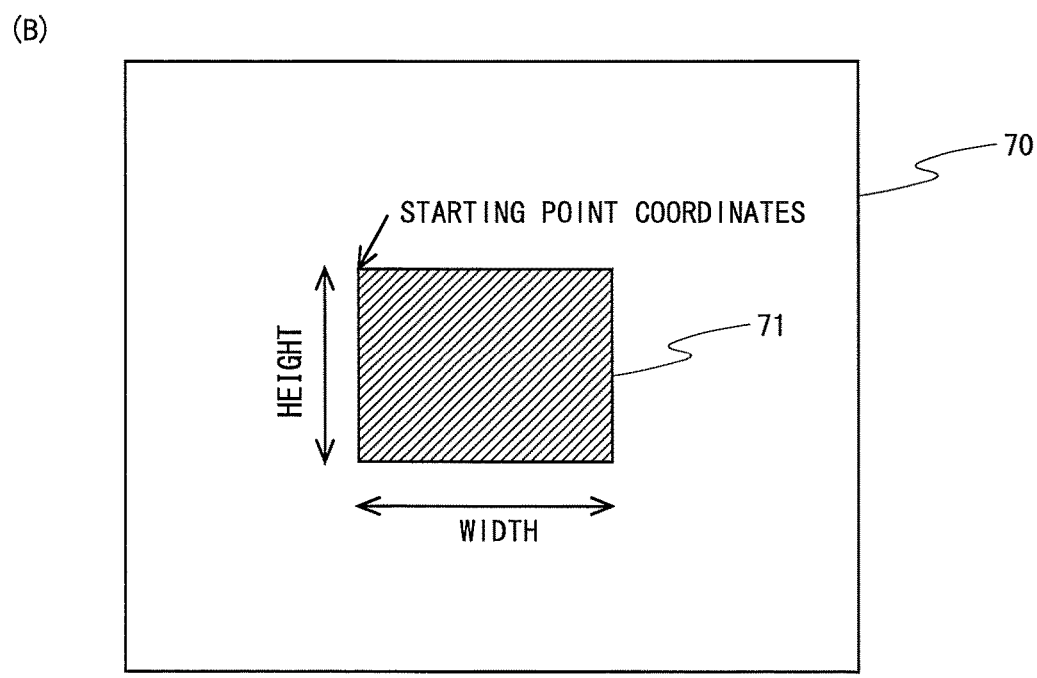

FIG. 5(A) is a diagram illustrating another method for specifying the image display area 71, and FIG. 5(B) is a diagram illustrating still another method for specifying the image display area 71. The image display area 71 can be specified by designating starting point and end point coordinates of the rectangular image display area 71, which are pixel coordinates at the top left corner and the bottom right corner, respectively, as shown in FIG. 5(A). Moreover, the image display area 71 can be specified also by designating the height and the width of the image display area 71 in addition to the starting point coordinates at the top left corner, as shown in FIG. 5(B). By using these, it is also rendered possible for the determination portion 22 to readily determine whether pixels represented by input image data DV are pixels P within the image display area 71.

Second Embodiment

The same block diagram as the block diagram of the liquid crystal display device 10 according to the first embodiment shown in FIG. 1 illustrates the circuit configuration of a liquid crystal display device according to a second embodiment of the present invention, and therefore, any block diagram and description thereof will be omitted.

Figure 6:
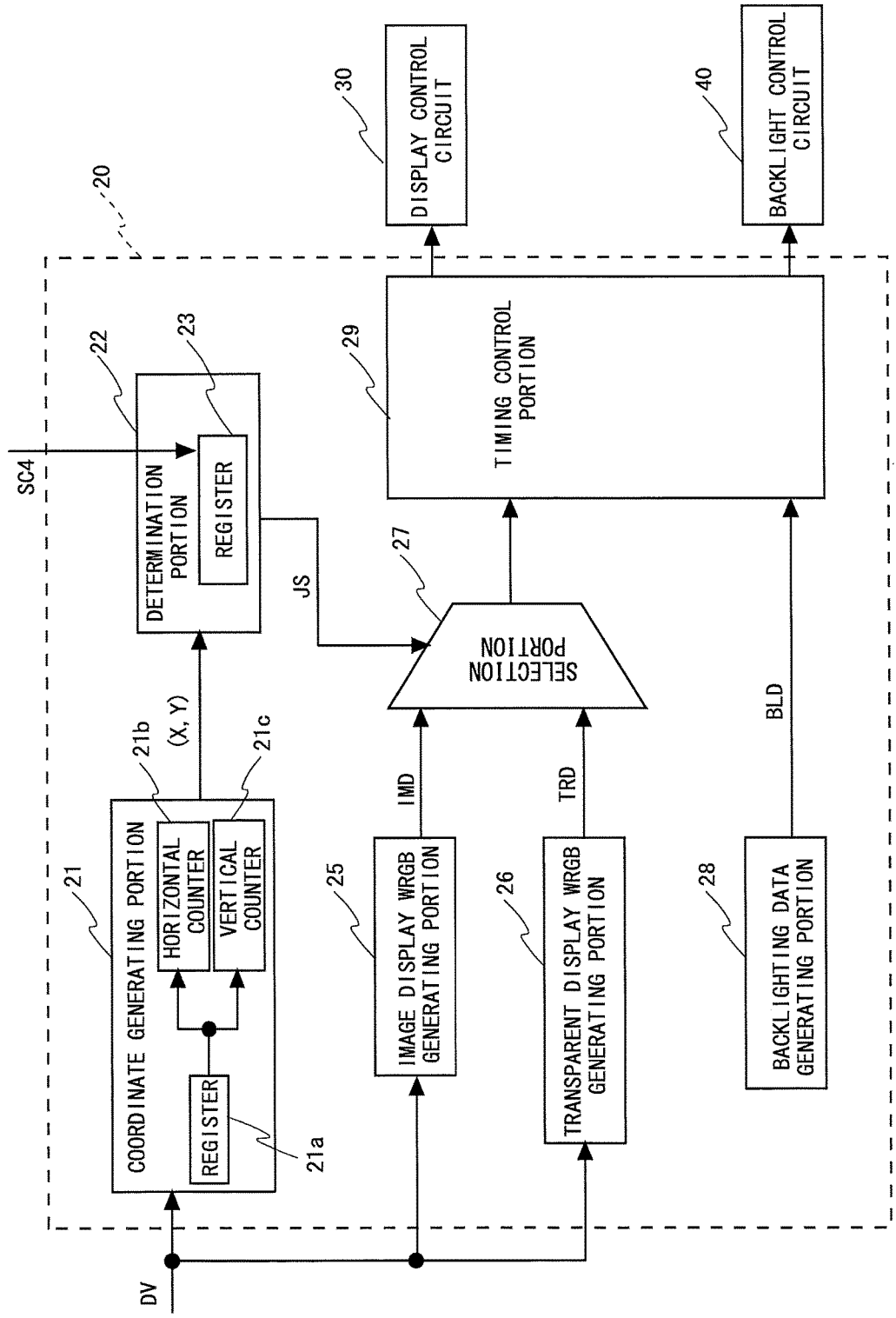
FIG. 6 is a block diagram illustrating the circuit configuration of a data generation/timing control circuit included in a liquid crystal display device according to a second embodiment.

FIG. 6 is a block diagram illustrating the circuit configuration of the data generation/timing control circuit 20 included in the liquid crystal display device according to the present embodiment. The block diagram illustrating the circuit configuration of the data generation/timing control circuit 20 shown in FIG. 6 is the same as the block diagram illustrating the circuit configuration of the data generation/timing control circuit 20 shown in FIG. 3, except for some components, therefore, these different components will be described mainly, the same components are denoted by the same reference characters, and any descriptions thereof will be omitted.

Figure 7:
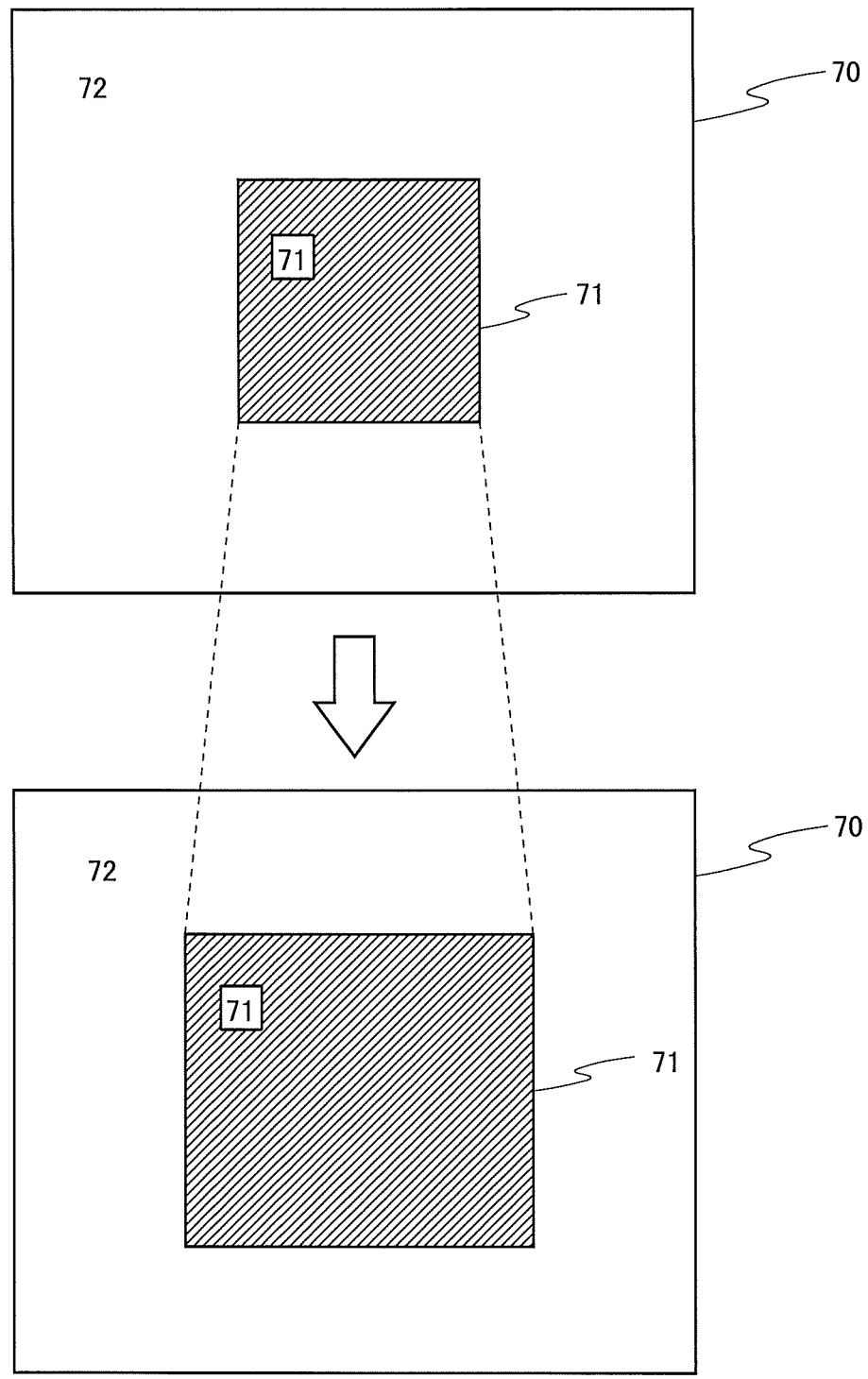
FIG. 7 is a diagram where an image display area of a liquid crystal panel in the liquid crystal display device according to the second embodiment is increased in size.

As shown in FIG. 6, the determination portion 22 of the data generation/timing control circuit 20 includes a different register 23 from that shown in FIG. 3, and the register 23 is volatile memory that is externally rewritable by a control signal SC4, so that the viewer can appropriately rewrite the coordinates of the four vertices for specifying the image display area 71, thereby changing the size and the position of the image display area 71. FIG. 7 is a diagram where the image display area 71 is increased in size. As shown in FIG. 7, the size of the image display area 71 can be changed by altering the input image data DV. Thus, in accordance with the changed size of the image display area 71, it is possible to adjust the number of characters to be displayed and change the size of character and image.

Furthermore, when the size or position of the image display area 71 is changed by rewriting the coordinates of the image display area 71 that are held in the register 23 of the determination portion 22, it is necessary to provide backlight in accordance with such a change. Therefore, the light guiding plate 80 is replaced by a light guiding plate with the size or position of the light-emitting area 81 for emitting backlight changed in accordance with the size and position of the image display area 71. As a result, the image display area 71 with the changed size or position can be irradiated with backlight.

It should be noted that in the case where the image display area 71 has a rectangular shape and is specified by the starting point and end point coordinates, or by the starting point coordinates, the width, and the height, as in the case shown in FIG. 5(A) or FIG. 5(B), the size or position of the image display area 71 is changed by altering such parameters instead of altering the coordinates of the four vertices.

In the present embodiment, even in the case where the size or position of the image display area 71 is changed, the image display area 71 displays an image with reduced color breakup without reducing the transparency of the transparent display area 72, as in the first embodiment. Thus, it is possible to adjust the number of characters to be displayed in the image display area 71 and change the size of character and image.

Third Embodiment

The same block diagram as the block diagram of the liquid crystal display device 10 according to the first embodiment shown in FIG. 1 illustrates the circuit configuration of a liquid crystal display device according to a third embodiment of the present invention, and therefore, any block diagram and description thereof will be omitted.

Figure 8:
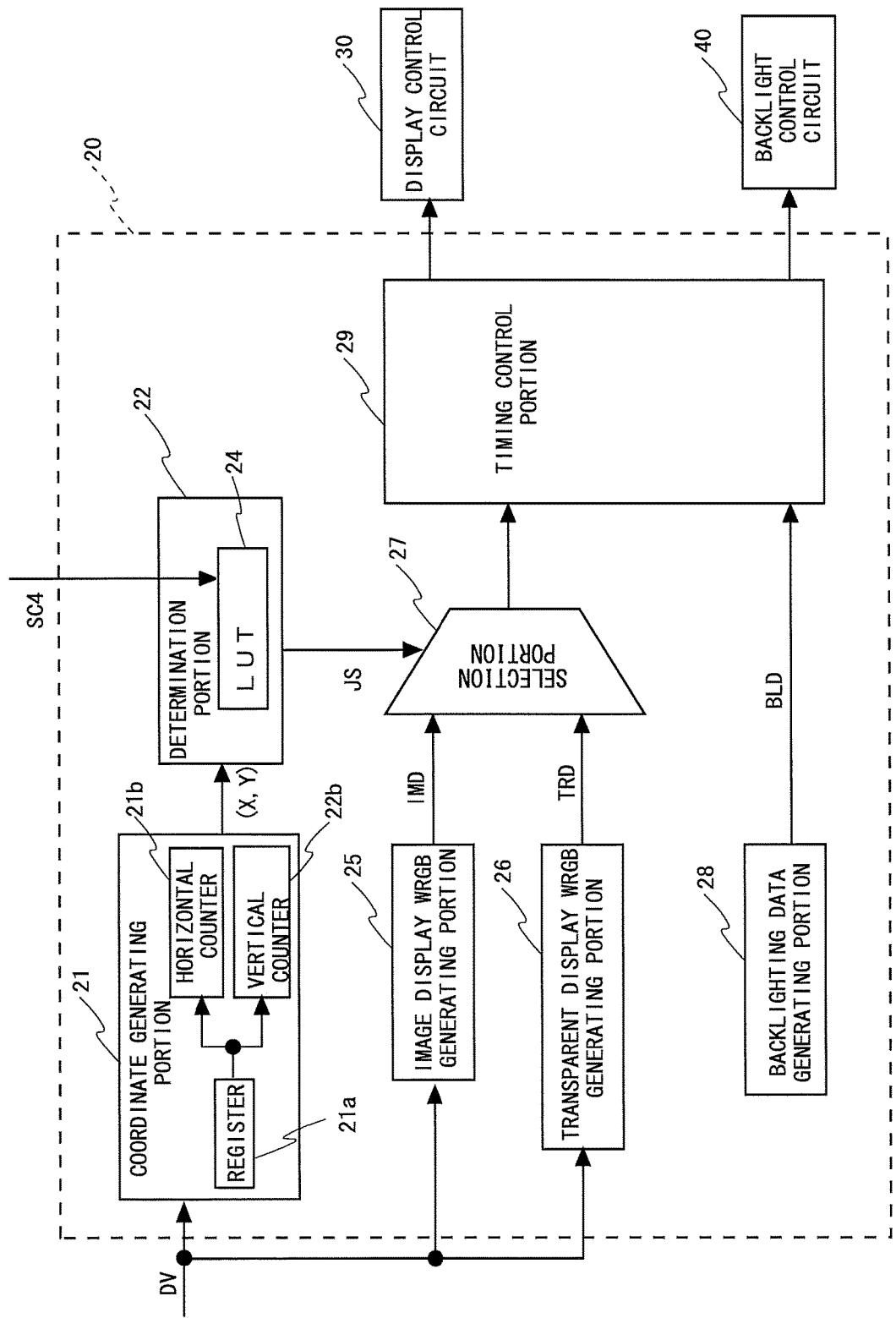
FIG. 8 is a block diagram illustrating the circuit configuration of a data generation/timing control circuit included in a liquid crystal display device according to a third embodiment.

FIG. 8 is a block diagram illustrating the circuit configuration of the data generation/timing control circuit 20 included in the liquid crystal display device according to the present embodiment. The block diagram illustrating the circuit configuration of the data generation/timing control circuit 20 shown in FIG. 8 is the same as the block diagram illustrating the circuit configuration of the data generation/timing control circuit 20 shown in FIG. 3, except for some components, therefore, these different components will be described mainly, the same components are denoted by the same reference characters, and any descriptions thereof will be omitted.

As shown in FIG. 8, the determination portion 22 of the data generation/timing control circuit 20 is provided with a lookup table 24 in place of the register 22a. FIG. 9 is a diagram illustrating an example of the lookup table (LUT) 24 provided in the determination portion 22. As shown in FIG. 9, the lookup table 24 assigns an identifier to each pixel to indicate whether the pixel is within the transparent display area 72 or within the image display area 71. The pixels within the transparent display area 72 are assigned the identifier "0", and the pixels within the image display area 71 are assigned the identifier "1". The identifiers "1" of coordinates at the top left and bottom right corners of the lookup table 24 correspond to the starting point coordinates at the top left corner and the end point coordinates at the bottom right corner, respectively, of the image display area 71.

When the coordinate generating portion 21 provides coordinates (X,Y) to the determination portion 22, the determination portion 22 reads the identifier at the position that corresponds to the provided coordinates (X,Y) from the lookup table 24. The determination portion 22 determines that the pixel is within the transparent display area 72 when the identifier being read is "0", or that the pixel is within the image display area 71 when the identifier being read is "1", and the determination portion 22 provides the determination result to the selection portion 27 in the form of determination value JS, as in the first embodiment. Note that the register 22a, the register 23, and the lookup table 24 will also be referred to collectively as the "holding means".

Figure 10:
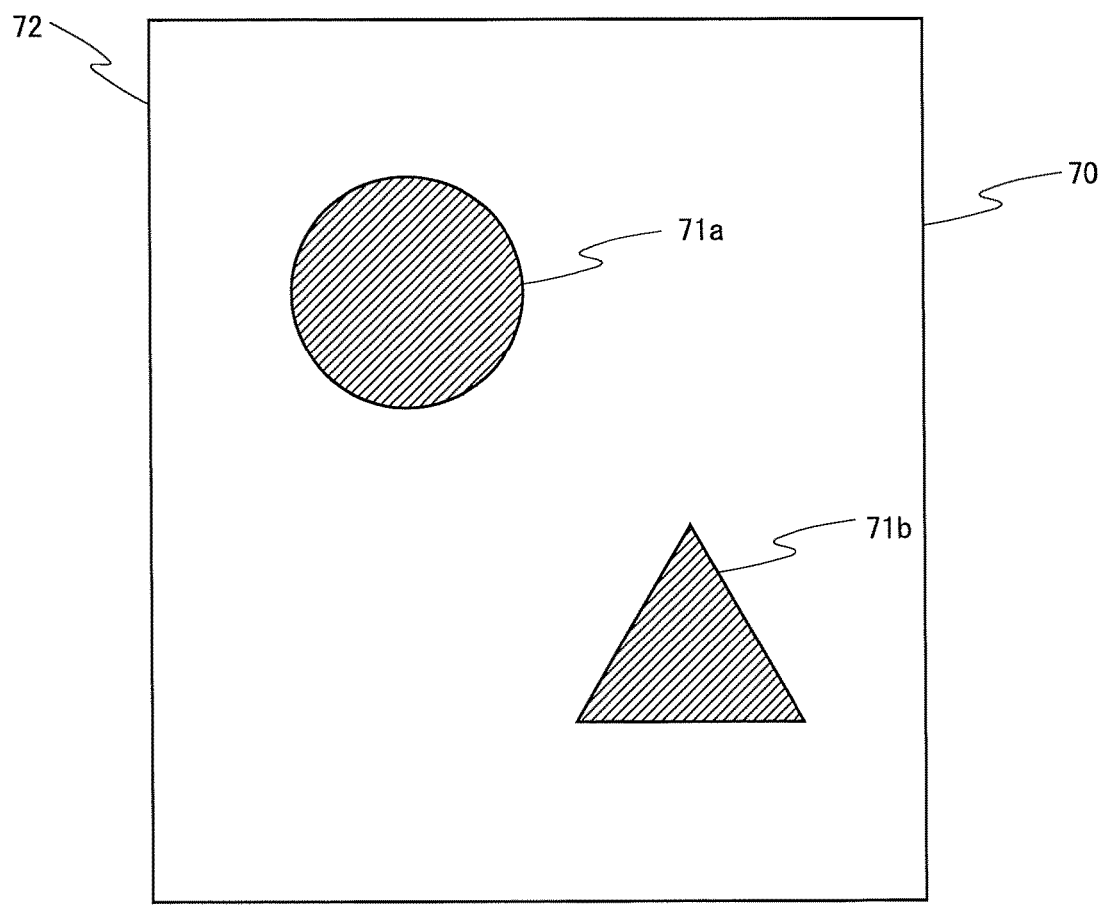
FIG. 10 is a diagram illustrating examples of an image display area set by using the lookup table in the liquid crystal display device according to the third embodiment.

In the present embodiment, as in the first embodiment, the transparent display area 72 displays a background with high transparency, and the image display area 71 displays an image with reduced color breakup. Furthermore, the following effects can be achieved by using the lookup table 24. FIG. 10 is a diagram illustrating examples of the image display area 71 that is set by using the lookup table 24. As shown in FIG. 10, the image display area 71 can be readily shaped into an arbitrary form such as a circle 71a or a triangle 71b. Moreover, it is also possible to simultaneously set a plurality of image display areas 71 on the liquid crystal panel 70 without difficulty.

Fourth Embodiment

The same block diagram as the block diagram of the liquid crystal display device 10 according to the first embodiment shown in FIG. 3 illustrates the circuit configuration of a liquid crystal display device according to a fourth embodiment of the present invention, and therefore, any block diagram and description thereof will be omitted.

Figure 11:
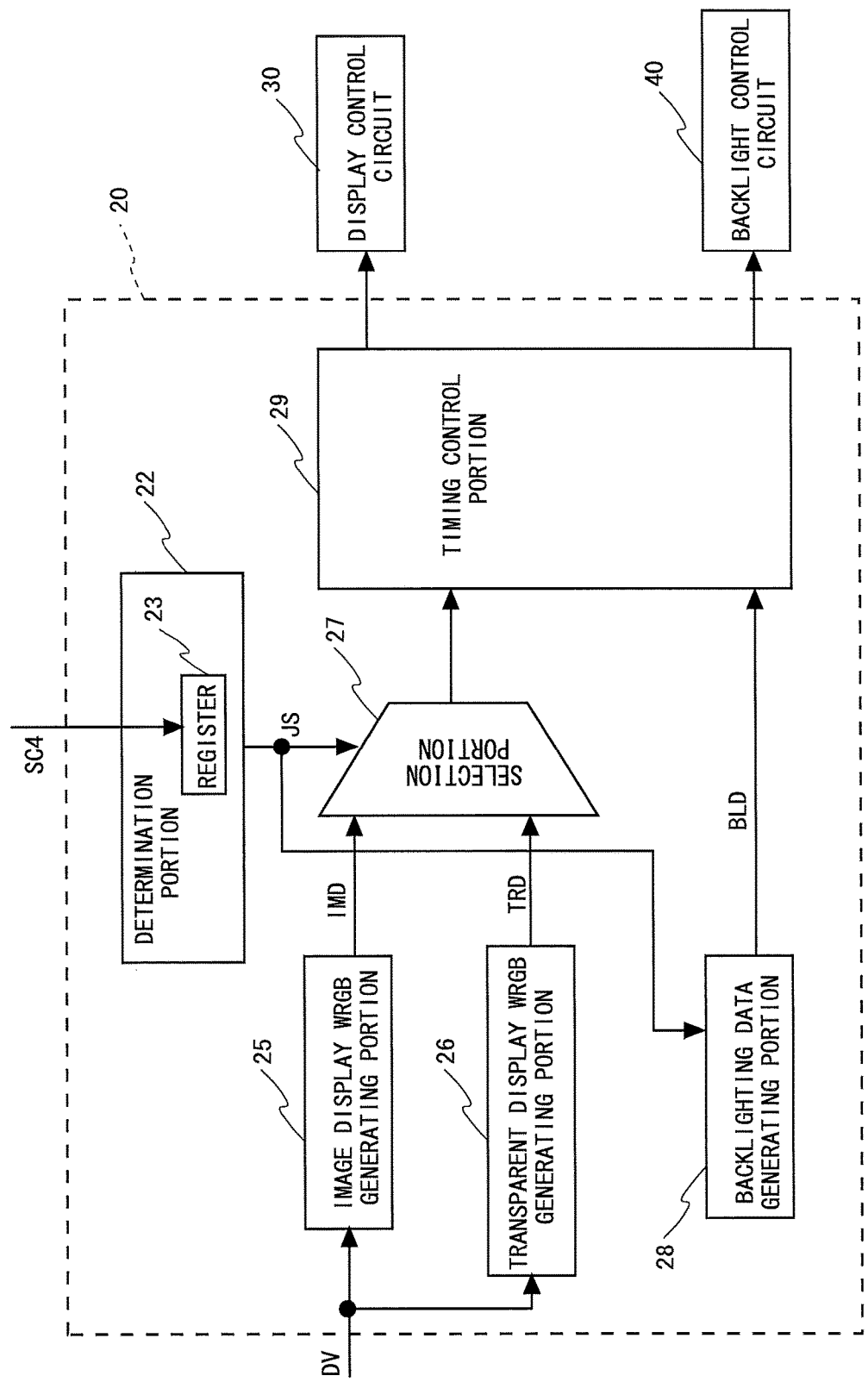
FIG. 11 is a block diagram illustrating the circuit configuration of a data generation/timing control circuit included in a liquid crystal display device according to a fourth embodiment.

FIG. 11 is a block diagram illustrating the circuit configuration of the data generation/timing control circuit 20 included in the liquid crystal display device according to the present embodiment. The block diagram illustrating the circuit configuration of the data generation/timing control circuit 20 shown in FIG. 11 is the same as the block diagram illustrating the circuit configuration of the data generation/timing control circuit 20 shown in FIG. 3, except for some components, therefore, these different components will be described mainly, the same components are denoted by the same reference characters, and any descriptions thereof will be omitted.

As shown in FIG. 11, in the present embodiment, no coordinate generating portion is provided, so that the input image data DV is provided directly to the determination portion 22. The determination portion 22 is provided with an externally rewritable register 23. The register 23 holds, for example, the reference grayscale value "255" for red, green, and blue image data included in the input image data DV. Accordingly, upon every provision of input image data DV, grayscale values represented by red, green, and blue image data included in the input image data DV are compared field by field with the reference grayscale value held in the register 23. As a result, for any pixel, if the grayscale values for all fields are determined to be the same as the reference grayscale value "255", the determination portion 22 determines that the pixel is within the transparent display area 72, but if otherwise, the determination portion 22 determines that the pixel is within the image display area 71. For example, as in the first embodiment, when any pixel is determined to be within the transparent display area 72, the determination portion 22 provides "0" to the selection portion 27 and the backlighting data generating portion 28 as a determination value JS, and when the pixel is determined to be within the image display area 71, the determination portion 22 provides "1" to the selection portion 27 and the backlighting data generating portion 28 as a determination value JS. When the backlighting data generating portion 28 is provided with "1" as a determination value JS, the backlighting data generating portion 28 generates and provides backlighting data BLD to the timing control portion 29. The subsequent processing by the data generation/timing control circuit 20 is the same as in the first embodiment, and therefore, any description thereof will be omitted.

It should be noted that in the first through third embodiments, any pixel whose grayscale values represented by the red, green, and blue image data included in the input image data DV are all 255 (where the data is 8-bit) is determined to be within the transparent display area 72, and the grayscale values for the white, red, green, and blue fields are obtained by the above equations (2) to (5) so as to prioritize transparency. However, even if not all of the grayscale values are 255, when the values are, for example, 253 or higher, the pixel may be determined to be within the transparent display area 72. In this case, the reference grayscale value "253" is set in the register 23. In addition, the determination portion 22 determines that any pixel whose grayscale values for the red, green, and blue image data included in the input image data DV are all 253 or higher is within the transparent display area 72. The coordinates that specify the image display area 71 and the reference grayscale value will also be referred to collectively as the "reference values".

The present embodiment achieves similar effects to those achieved by the first embodiment. Moreover, since the input image data DV is used to determine whether the pixels are within the image display area 71, there is no need to provide the coordinate generating portion in the data generation/timing control circuit 20, with the result that the production cost thereof can be reduced.

Fifth Embodiment

The same block diagram as the block diagram of the liquid crystal display device 10 according to the first embodiment shown in FIG. 1 illustrates the circuit configuration of a liquid crystal display device according to a fifth embodiment of the present invention, and therefore, any block diagram and description thereof will be omitted.

Figure 12:
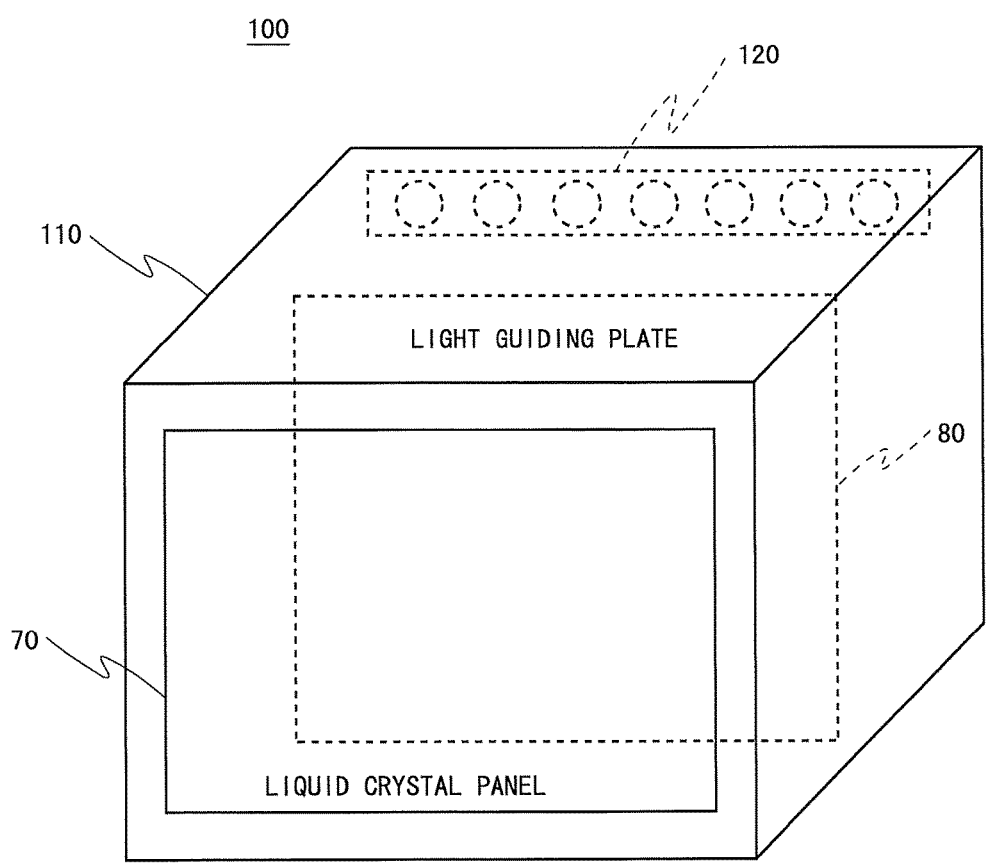
FIG. 12 is a perspective view illustrating the configuration of a liquid crystal display device according to a fifth embodiment.

FIG. 12 is a perspective view illustrating the configuration of the liquid crystal display device 100 according to the present embodiment. As shown in FIG. 12, the liquid crystal panel 70 is attached to a side surface of a housing 110 provided in the form of a rectangular parallelepiped, and an illumination light source 120 with an array of LEDs for emitting red, green, and blue light is attached to a side surface opposite the side surface with the liquid crystal panel 70. The illumination light source 120 is driven in a field-sequential mode by an illumination light source driver circuit (not shown), such that the LEDs for the colors emit light sequentially in a time division manner. Note that the LEDs for the colors may emit light simultaneously rather than sequentially in a time division manner.

Furthermore, the light guiding plate 80 is disposed parallel to the liquid crystal panel 70 in the space between the liquid crystal panel 70 and the illumination light source 120, and the light guiding plate 80 has attached to edges thereof a light source (not shown) consisting of LEDs for emitting red, green, and blue light. Accordingly, when the light source is powered on, the LEDs emit light from the light guiding plate 80 toward the liquid crystal panel 70. Note that the liquid crystal display device 100 will also be referred to as the "display device", and the illumination light source 120 will also be referred to as the "illuminating means".

The light guiding plate 80 may have a reflective sheet (not shown) affixed to the back surface so as to be able to efficiently reflect backlight toward the liquid crystal panel 70, and the light guiding plate 80 may also have a diffusing sheet (not shown) affixed to the front surface so as to uniformly provide backlight.

Figure 13:
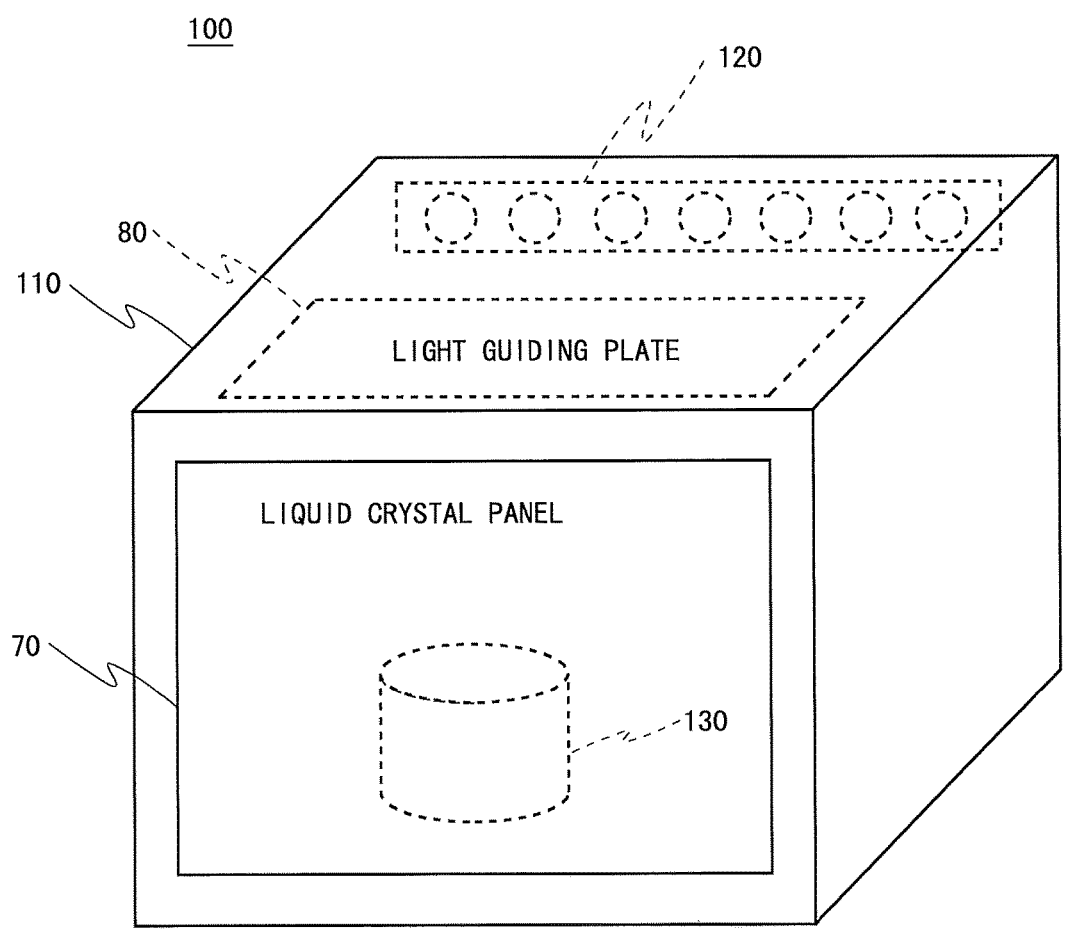
FIG. 13 is a perspective view illustrating the configuration of the liquid crystal display device according to the fifth embodiment functioning as a transparent display.

FIG. 13 is a perspective view illustrating the configuration of the liquid crystal display device 100 according to the present embodiment where the liquid crystal display device 100 functions as a transparent display. As shown in FIG. 13, the light guiding plate 80 is attached at the top side to the top surface of the housing 110. Accordingly, by turning the light guiding plate 80 by 90 degrees using the top side as the axis of rotation, the light guiding plate 80 can be kept from being positioned directly behind the liquid crystal panel 70. In this case, backlight is not emitted from the light guiding plate 80 toward the liquid crystal panel 70, but by lighting up the illumination light source 120, the light emitted from the illumination light source 120 fills the housing 110.

Figure 14:
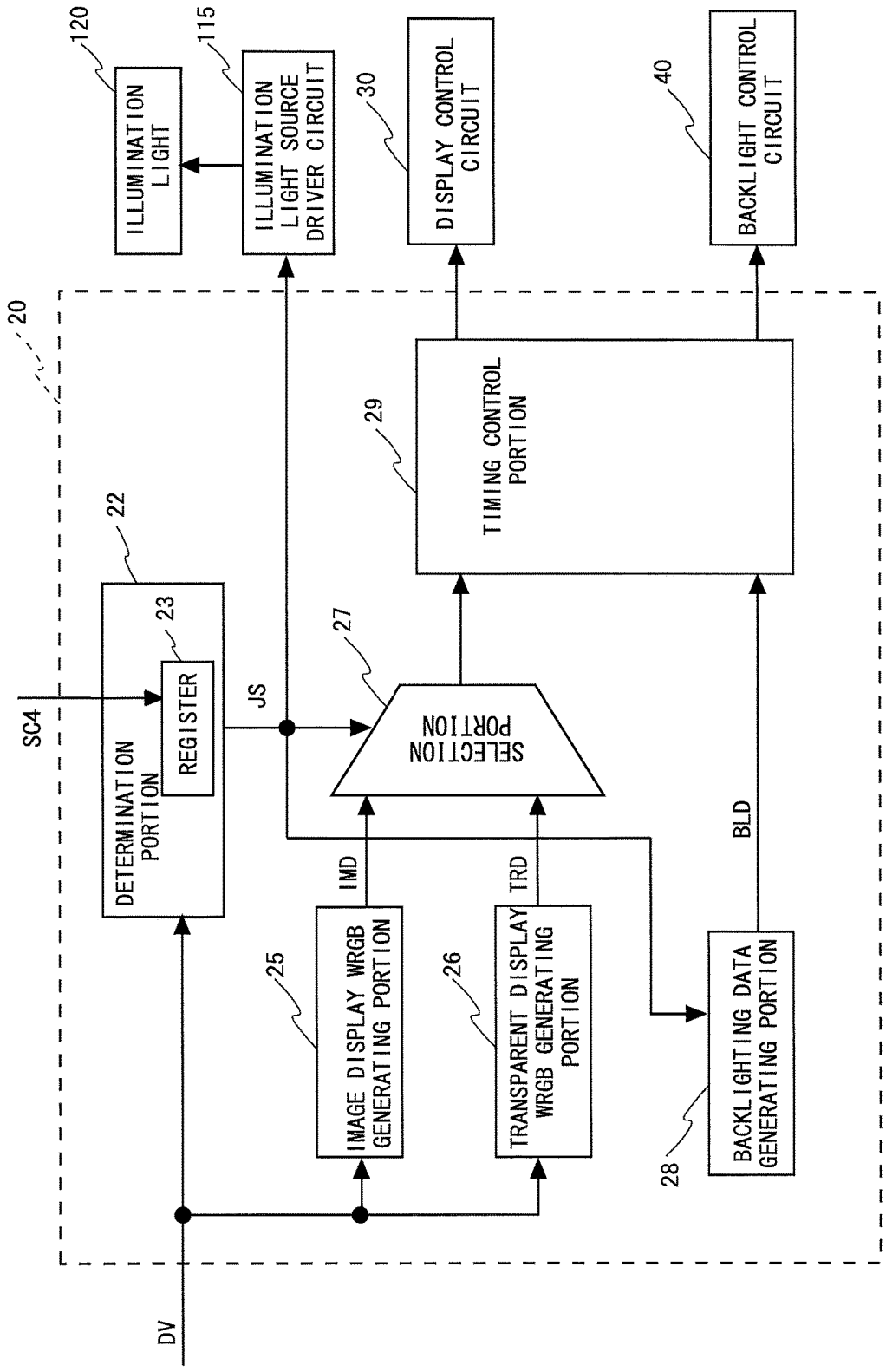
FIG. 14 is a block diagram illustrating the circuit configuration of the data generation/timing control circuit included in the liquid crystal display device according to the fifth embodiment.

FIG. 14 is a block diagram illustrating the circuit configuration of the data generation/timing control circuit 20 included in the liquid crystal display device according to the present embodiment. The block diagram illustrating the circuit configuration of the data generation/timing control circuit 20 shown in FIG. 14 is the same as the block diagram illustrating the circuit configuration of the data generation/timing control circuit 20 shown in FIG. 3, except for some components, therefore, these different components will be described mainly, the same components are denoted by the same reference characters, and any descriptions thereof will be omitted.

As shown in FIG. 14, the data generation/timing control circuit 20 is not provided with the coordinate generating portion, and the input image data DV is provided to the image display WRGB generating portion 25 and the transparent display WRGB generating portion 26 but not to the determination portion 22.

The determination portion 22 includes an externally rewritable register 23. The register 23 prestores information for each frame, regarding whether the input image data DV is intended for background display in the transparent display area 72 or for image display in the image display area 71. The determination portion 22 reads information held in the register 23, and when the determination portion 22 determines that the information is intended for background display in the transparent display area 72, the determination portion 22 provides "0" to the selection portion 27, the backlighting data generating portion 28, and the illumination light source driver circuit 115 as a determination value JS. On the other hand, when the information is determined to be intended for image display in the image display area 71, the determination portion 22 provides "1" to the selection portion 27, the backlighting data generating portion 28, and the illumination light source driver circuit 115 as a determination value JS.

When the backlighting data generating portion 28 is provided with "1" as a determination value JS, the backlighting data generating portion 28 generates backlighting data BLD for driving the backlight control circuit 40 for backlight emission. The subsequent processing by the backlighting data generation/timing control circuit 20 is the same as in the first embodiment, and therefore, any description thereof will be omitted. When the illumination light source driver circuit 115 is provided with "0" as a determination value JS, the illumination light source driver circuit 115 drives the illumination light source 120 in a field-sequential mode, thereby sequentially lighting up the LEDs for the colors and filling the housing 110 with the light emitted by the illumination light source 120.

In the present embodiment, unlike in the first through fourth embodiments, the transparent display area 72 and the image display area 71 of the liquid crystal display device are not provided in a single screen, and the entire liquid crystal panel 70 functions either as the transparent display area 72 or the image display area 71. Accordingly, referring to FIG. 13, the case where the entire screen functions as the transparent display area 72 will be described first. Externally provided input image data DV is supplied to the transparent display WRGB generating portion 26 and the image display WRGB generating portion 25. The transparent display WRGB generating portion 26 generates transparent display WRGB data TRD from the input image data DV using the above equations (2) to (5), and provides the generated data to the selection portion 27. The image display WRGB generating portion 25 generates image display WRGB data IMD from the input image data DV using the above equations (7) to (10), and provides the generated data to the selection portion 27. The selection portion 27 is provided with "0" by the determination portion 22 as a determination value JS which denotes the transparent display area 72, and therefore, the selection portion 27 selects and provides the transparent display WRGB data TRD to the timing control portion 29. In this case, the illumination light source driver circuit 115 is also provided with "0" as a determination value JS, so that the illumination light source 120 is powered on and lit up. As a result, all of the grayscale values for the white, red, green, and blue fields are set at "255", so that the liquid crystal panel 70 functions as a highly transparent panel. Consequently, the light from the illumination light source 120 illuminates an exhibit 130 placed in the housing 110, and light reflected by the exhibit 130 is transmitted through the liquid crystal panel 70. Thus, the viewer in front of the liquid crystal display device 100 can see through the liquid crystal panel 70 and view the exhibit 130 placed behind the liquid crystal panel 70.

Next, referring to FIG. 12, the case where the entire screen functions as the image display area 71 will be described. In this case, when the backlighting data generating portion 28 and the illumination light source driver circuit 115 are provided with "1" as a determination value JS which denotes the image display area 71, the light guiding plate 80 is disposed directly behind the liquid crystal panel 70 so as to be parallel thereto, as shown in FIG. 12, and the illumination light source 120 is powered off. Moreover, the light source attached to the edge of the light guiding plate 80 is powered on. As a result, backlight emitted by the light guiding plate 80 illuminates the entire liquid crystal panel 70.

In this state, externally provided input image data DV is supplied to the image display WRGB generating portion 25 and the transparent display WRGB generating portion 26. The image display WRGB generating portion 25 generates image display WRGB data IMD from the input image data DV using the above equations (7) to (10), and provides the generated data to the selection portion 27. The transparent display WRGB generating portion 26 generates transparent display WRGB data TRD from the input image data DV using the above equations (2) to (5), and provides the generated data to the selection portion 27. The selection portion 27 is provided with "1" by the determination portion 22 as a determination value JS which denotes the image display area 71, and therefore, the selection portion 27 provides the image display WRGB data IMD to the timing control portion 29. As a result, the liquid crystal panel 70 of the liquid crystal display device 100 displays an image composed by the white field inserted among the red, green, and blue fields, and therefore, the viewer can see an image with reduced occurrence of color breakup.

In this manner, in the liquid crystal display device 100 according to the present embodiment, the entire liquid crystal panel 70 functions either as the image display area 71 or the transparent display area 72. Accordingly, the image display area 71 and the transparent display area 72 are not intended to work in concert to display both an image and a background at the same time. Note that the method for moving the light guiding plate 80 is not limited to the aforementioned method, and a different method may be employed.

In the present embodiment, when the liquid crystal display device 100 is used as a see-through display, the grayscale value of each field is obtained so as to prioritize transparency, so that the exhibit 130 placed behind the liquid crystal panel 70 can be seen clearly. On the other hand, when the display device is used as a display for image display, the grayscale value of each field is obtained so as to prioritize image quality, so that the occurrence of color breakup can be reduced. In this manner, the liquid crystal display device 100 according to the present embodiment can display an image clearly by optimally adjusting the grayscale value of an image in each field in accordance with the purpose of use.

DESCRIPTION OF THE REFERENCE CHARACTERS

10 liquid crystal display device (display device)
20 data generation/timing control circuit (data generating means)
21 coordinate generating portion
21*a* register
21*b* horizontal counter (counter)
21*c* vertical counter (counter)
22 determination portion
22*a* register (holding means)
23 register (holding means)
24 lookup table (holding means)
25 image display WRGB generating portion (image display data generating portion)
26 transparent display WRGB generating portion (transparent display data generating portion)
27 selection portion
28 backlighting data generating portion
29 timing control portion
71 image display area
72 transparent display area
81 light-emitting area
40 backlight control circuit (light source control circuit)
70 liquid crystal panel (display panel)
80 light guiding plate (irradiating means)
90 backlighting light source (irradiating means)
100 liquid crystal display device (display device)
110 housing
120 illumination light source (illuminating means)
130 exhibit

The invention claimed is:

1. A display device providing color display in a field-sequential mode by dividing externally provided input image data into a plurality of fields for each frame, providing light in a different color for each of the fields, and providing image data corresponding to the provided light, the device comprising:
   a display panel with a plurality of pixels arranged in a matrix;
   backlighting light source that irradiates the display panel with light of a different color for each of the fields, the backlighting light source including a plurality of light sources emitting light of different colors;
   a driver circuit configured to write the image data to the pixels of the display panel for each of the fields;
   a light source control circuit configured to control the backlighting light source to provide the light of a different color for each of the fields; and
   a data generation circuit that controls the driver circuit and the light source control circuit to write image data corresponding to colors of light emitted by the light sources, provided that the frame is divided into more fields than the number of the light sources, at least two of the light sources emit light in a mixed color for at least one of the fields, and the light sources sequentially emit light for the remaining fields, wherein,
   the data generation circuit includes a memory that stores reference values to specify an image display area and compare specific values to identify the pixels included in the input image data with the reference values being read from the memory, so that any pixel with the specific value within a range specified by the reference values is considered to be within the image display area in which image display is provided by obtaining a grayscale value of the image data for each of the fields so as to prioritize color breakup reduction, and any pixel with the specific value out of the range specified by the reference values is considered to be within a transparent display area in which a background is displayed by obtaining a grayscale value of the image data for each of the fields so as to prioritize transparency,
   the light sources are light sources emitting red, green, or blue light,
   the frame includes a white field for which the red light, the green light, and the blue light are provided simultaneously, a red field for which the red light is provided, a green field for which the green light is provided, and a blue field for which the blue light is provided, the data generation circuit further includes:
an image display data generating circuit that obtains the grayscale value of the image data for the pixels for each of the fields to prioritize the color breakup reduction; and
a transparent display data generating circuit that obtains the grayscale value of the image data for the pixels for each of the fields to prioritize the transparency,
the image display data generating circuit generates image display data representing an image derived from the input image data, on a basis of the input image data using a minimum grayscale value of the image data for the red field, the green field, and the blue field as a grayscale value of the image data for the white field, and new grayscale values of the image data for the red field, the green field, and the blue field obtained by subtracting the grayscale value of the image data for the white field from each of the grayscale values of the image data for the red field, the green field, and the blue field, and
the transparent display data generating circuit generates transparent display data to display the background on the basis of the input image data using the minimum grayscale value of the image data for the red field, the green field, and the blue field as a grayscale value of the image data for the white field, and the grayscale values of the image data for the red field, the green field, and the blue field as new grayscale values of the image data for the red field, the green field, and the blue field.

2. The display device according to claim 1, wherein any two of the red light source, the green light source, and the blue light source are lit up to add another mixed-color field for which any one of cyan, yellow, or magenta light is provided.

3. A display device providing color display in a field-sequential mode by dividing externally provided input image data into a plurality of fields for each frame, providing light in a different color for each of the fields, and providing image data corresponding to the provided light, the device comprising:
a display panel with a plurality of pixels arranged in a matrix;
a backlighting light source that irradiates the display panel with light of a different color for each of the fields, the backlighting light source including a plurality of light sources emitting light of different colors;
a driver circuit configured to write the image data to the pixels of the display panel for each of the fields;
a light source control circuit configured to control the backlighting light source to provide the light of a different color for each of the fields; and
a data generation circuit that controls the driver circuit and the light source control circuit to write image data corresponding to colors of light emitted by the light sources, provided that the frame is divided into more fields than the number of the light sources, at least two of the light sources emit light in a mixed color for at least one of the fields, and the light sources sequentially emit light for the remaining fields, wherein,
the data generation circuit includes a memory that stores reference values to specify an image display area and compare specific values to identify the pixels included in the input image data with the reference values being read from the memory, so that any pixel with the specific value within a range specified by the reference values is considered to be within the image display area in which image display is provided by obtaining a grayscale value of the image data for each of the fields so as to prioritize color breakup reduction, and any pixel with the specific value out of the range specified by the reference values is considered to be within a transparent display area in which a background is displayed by obtaining a grayscale value of the image data for each of the fields so as to prioritize transparency, wherein
the data generation circuit further includes:
a coordinate generating circuit that obtains coordinate data indicating a position of a pixel provided by the input image data;
a determination circuit including the memory that stores the reference values and compares the coordinate data provided by the coordinate generating circuit with the reference values being read from the memory, thereby determining whether the coordinate data is data for a pixel within the image display area for which a grayscale value of image data is to be obtained for each field so as to prioritize transparency or data for a pixel within the transparent display area for which a grayscale value of image data is to be obtained for each field so as to prioritize color breakup reduction;
an image display data generating circuit that generates image data for the pixels for each of the fields so as to prioritize color breakup reduction, on a basis of the input image data;
a transparent display data generating circuit that generates image data for the pixels for each of the fields so as to prioritize transparency, on the basis of the input image data;
a selection circuit that selects and outputs either the data for the pixels generated by the image display data generating circuit or the data for the pixels generated by the transparent display data generating circuit, on a basis of a result of the determination by the determination circuit;
a backlighting data generating circuit that generates backlighting data for each frame; and
a timing control circuit that controls timing of outputting the backlighting data provided by the backlighting data generating circuit and timing of outputting the image data provided by the selection circuit, and
the coordinate generating circuit includes:
a register that includes shape data representing a shape of the image display area; and
a counter that counts a number of pixels provided by the input image data until the number of pixels reaches a total number of pixels for one frame determined by the shape data, and
the coordinate generating circuit provides the determination circuit with the coordinate data upon each increment of the number of pixels in the counter.

4. The display device according to claim 3, wherein the memory includes a further register that allows the reference values to be externally rewritten.

5. The display device according to claim 4, wherein, provided that the shape of the image display area is a rectangle, the reference values correspond to coordinates of four vertices of the image display area.

6. The display device according to claim 4, wherein, provided that the shape of the image display area is a rectangle, the reference values correspond to coordinates of one of four vertices of the image display area and coordinates of another vertex diagonal to that vertex.

7. The display device according to claim 4, wherein, provided that the shape of the image display area is a rectangle, the reference values correspond to coordinates of one of four vertices of the image display area and the width and the height of the rectangle.

8. The display device according to claim 3, wherein the memory includes a lookup table that contains coordinates specifying the image display area as the reference values and allows the reference values to be externally rewritten for each of the pixels.

9. A display device providing color display in a field-sequential mode by dividing externally provided input image data into a plurality of fields for each frame, providing light in a different color for each of the fields, and providing image data corresponding to the provided light, the device comprising:
   a display panel with a plurality of pixels arranged in a matrix;
   a backlighting light source that irradiates the display panel with light of a different color for each of the fields, the backlighting light source including a plurality of light sources emitting light of different colors;
   a driver circuit configured to write the image data to the pixels of the display panel for each of the fields;
   a light source control circuit configured to control the backlighting light source to provide the light of a different color for each of the fields; and
   a data generation circuit that controls the driver circuit and the light source control circuit to write image data corresponding to colors of light emitted by the light sources, provided that the frame is divided into more fields than the number of the light sources, at least two of the light sources emit light in a mixed color for at least one of the fields, and the light sources sequentially emit light for the remaining fields, wherein,
   the data generation circuit includes a memory that stores reference values to specify an image display area and compare specific values to identify the pixels included in the input image data with the reference values being read from the memory, so that any pixel with the specific value within a range specified by the reference values is considered to be within the image display area in which image display is provided by obtaining a grayscale value of the image data for each of the fields so as to prioritize color breakup reduction, and any pixel with the specific value out of the range specified by the reference values is considered to be within a transparent display area in which a background is displayed by obtaining a grayscale value of the image data for each of the fields so as to prioritize transparency, wherein
   the data generation circuit further includes:
      a determination circuit including the memory that stores externally rewritable reference grayscale values for the fields as the reference values, the determination circuit compares a grayscale value of a pixel provided by the input image data with the reference grayscale value being read from the memory, thereby determining whether the pixel is a pixel within the image display area for which a grayscale value of image data is to be obtained for each field so as to prioritize transparency or data for a pixel within the transparent display area for which a grayscale value of image data is to be obtained for each field so as to prioritize color breakup reduction;
      an image display data generating circuit that generates the image data for the pixels for each of the fields so as to prioritize color breakup reduction, on a basis of the input image data;
      a transparent display data generating circuit that generates the image data for the pixels for each of the fields so as to prioritize transparency, on the basis of the input image data;
      a selection circuit that selects and outputs either the image data for the pixels generated by the image display data generating circuit or the image data for the pixels generated by the transparent display data generating circuit, on a basis of a result of the determination by the determination circuit;
      a backlighting data generating circuit that generates backlighting data for each frame; and
      a timing control circuit that controls the timing of outputting the backlighting data provided by the backlighting data generating circuit and the timing of outputting the image data provided by the selection circuit.

* * * * *